United States Patent

Sanchez et al.

(10) Patent No.: US 12,468,783 B1
(45) Date of Patent: Nov. 11, 2025

(54) SYSTEMS AND METHODS FOR VALIDATING A VEHICULAR TRIP CLASSIFICATION AS FOR PERSONAL USE OR FOR WORK BASED UPON SIMILARITY IN DEVICE INTERACTION FEATURES

(71) Applicant: QUANATA, LLC, San Francisco, CA (US)

(72) Inventors: Kenneth Jason Sanchez, San Francisco, CA (US); Gil Tamari, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 950 days.

(21) Appl. No.: 17/524,550

(22) Filed: Nov. 11, 2021

Related U.S. Application Data

(60) Provisional application No. 63/113,389, filed on Nov. 13, 2020.

(51) Int. Cl.
*G06F 18/241* (2023.01)
*G06F 18/211* (2023.01)
(Continued)

(52) U.S. Cl.
CPC .......... *G06F 18/241* (2023.01); *G06F 18/211* (2023.01); *G06F 18/2155* (2023.01);
(Continued)

(58) Field of Classification Search
CPC .... G06F 18/211; G06F 18/2155; G06F 18/22; G06F 18/241; G06F 18/2431; G06V 10/751; G06Q 40/08
See application file for complete search history.

(56) References Cited

U.S. PATENT DOCUMENTS

| 7,233,861 B2 | 6/2007 | Van Buer et al. |
| 7,701,363 B1 | 4/2010 | Zlojutro |

(Continued)

OTHER PUBLICATIONS

Chen, Chao, et al. "Trip2Vec: a deep embedding approach for clustering and profiling taxi trip purposes." Personal and Ubiquitous Computing 23 (2019): 53-66. (Year: 2019).*

(Continued)

*Primary Examiner* — Liang Y Li
(74) *Attorney, Agent, or Firm* — BRYAN CAVE LEIGHTON PAISNER LLP

(57) ABSTRACT

Method, system, device, and non-transitory computer-readable medium for classifying a vehicle trip. In one aspect, a computer-implemented method includes: obtaining a user classification associated with an unlabeled vehicular trip; obtaining a first set of historic device interaction data associated with work; obtaining a second set of historic device interaction data associated with personal use; training a classification model based at least in part upon the first set of historic device interaction data and the second set of historic device interaction data; obtaining a set of unlabeled device interaction data associated with the unlabeled vehicular trip; identifying and comparing a first set of baseline device interaction features, a second set of baseline device interaction features, a set of representative device interaction features; classifying the unlabeled vehicular trip; and validating the user classification based at least in part upon the user classification and the classification made using the classification model.

20 Claims, 4 Drawing Sheets

(51) Int. Cl.
  *G06F 18/214* (2023.01)
  *G06F 18/22* (2023.01)
  *G06F 18/2431* (2023.01)
  *G06N 20/00* (2019.01)
  *G06Q 40/08* (2012.01)
  *G06V 10/75* (2022.01)

(52) U.S. Cl.
  CPC .......... *G06F 18/22* (2023.01); *G06F 18/2431* (2023.01); *G06N 20/00* (2019.01); *G06Q 40/08* (2013.01); *G06V 10/751* (2022.01)

(56) References Cited

U.S. PATENT DOCUMENTS

| | | | |
|---|---|---|---|
| 8,044,809 | B2 | 10/2011 | Farmer |
| 8,989,914 | B1 | 3/2015 | Nemat-nasser et al. |
| 9,454,786 | B1 | 9/2016 | Srey et al. |
| 10,026,506 | B1 | 7/2018 | Laborde |
| 10,158,716 | B2 | 12/2018 | Paridel et al. |
| 10,169,822 | B1 | 1/2019 | Jarvis et al. |
| 10,776,879 | B1 | 9/2020 | Floyd |
| 10,946,862 | B1* | 3/2021 | Bischoff ............ G06Q 30/0645 |
| 11,585,671 | B1 | 2/2023 | Wu |
| 11,663,675 | B1 | 5/2023 | Estes |
| 2006/0271275 | A1 | 11/2006 | Verma |
| 2008/0103657 | A1 | 5/2008 | Norton et al. |
| 2011/0246246 | A1 | 10/2011 | Johnson |
| 2013/0030605 | A1 | 1/2013 | Basir et al. |
| 2013/0110393 | A1 | 5/2013 | Heed et al. |
| 2014/0039749 | A1 | 2/2014 | Jelbert et al. |
| 2014/0208108 | A1 | 7/2014 | Lester et al. |
| 2014/0222320 | A1 | 8/2014 | Lyuh et al. |
| 2015/0006207 | A1 | 1/2015 | Jarvis et al. |
| 2016/0055685 | A1 | 2/2016 | Lilly et al. |
| 2017/0309092 | A1 | 10/2017 | Rosenbaum |
| 2018/0012092 | A1 | 1/2018 | Gleeson-May |
| 2018/0259347 | A1 | 9/2018 | Khasis |
| 2018/0300816 | A1 | 10/2018 | Perl et al. |
| 2019/0005812 | A1 | 1/2019 | Matus |
| 2019/0266675 | A1 | 8/2019 | Palen et al. |
| 2019/0283745 | A1 | 9/2019 | Nagel |
| 2019/0383627 | A1 | 12/2019 | Nangeroni |
| 2020/0132479 | A1 | 4/2020 | Khasis |
| 2020/0143224 | A1* | 5/2020 | Wagle .................... G07B 15/02 |
| 2020/0149909 | A1 | 5/2020 | Beaurepaire |
| 2020/0302372 | A1 | 9/2020 | Ghatak et al. |
| 2020/0304951 | A1 | 9/2020 | Beaurepaire |
| 2020/0402089 | A1 | 12/2020 | Zhang et al. |
| 2021/0034929 | A1 | 2/2021 | Zilberman et al. |
| 2021/0082054 | A1* | 3/2021 | Rodriguez Bravo .. G06Q 40/08 |
| 2021/0123749 | A1* | 4/2021 | Kreig .................... G06Q 50/40 |
| 2021/0125076 | A1 | 4/2021 | Zhang et al. |
| 2021/0142191 | A1 | 5/2021 | Faruquie et al. |
| 2021/0241137 | A1 | 8/2021 | Jain |
| 2021/0374756 | A1* | 12/2021 | Pandey .................... G06N 3/08 |
| 2021/0406916 | A1* | 12/2021 | Zhai ....................... G06F 21/44 |
| 2022/0261920 | A1 | 8/2022 | Floyd |
| 2023/0128964 | A1 | 4/2023 | Tisseur et al. |

OTHER PUBLICATIONS

Yang et al., A Data Driven Travel Mode Share Estimation Framework based on Mobile Device Location Data, arxiv.org ID: 2006.10036, pp. 1-41 Jun. 17, 2020.

Saranya Mandava, "Cross Validation and Hyper-Parameter Tuning in Python", Sep. 18, 2018, retrieved from https://medium.com/@mandava807/cross-validation-and-hyperparameter-tuning-in-python-65cfb80ee485 2018.

iii.org, "Insuring Your Business: Small Business Owners' Guide to Insurance", Jun. 8, 2020, retrieved from https://www.iii.org/publications/insuring-your-business-small-business-owners-guide-to-insurance/specific-coverages/business-vehicle-insurance 2020.

* cited by examiner

SYSTEMS AND METHODS FOR VALIDATING A VEHICULAR TRIP CLASSIFICATION AS FOR PERSONAL USE OR FOR WORK BASED UPON SIMILARITY IN DEVICE INTERACTION FEATURES

CROSS-REFERENCES TO RELATED APPLICATIONS

This application claims priority to U.S. Patent Application No. 63/113,389 filed Nov. 13, 2020, which is incorporated by reference herein for all purposes.

The following nine applications, including this one, are being filed concurrently and the other eight are hereby incorporated by reference in their entirety for all purposes:
1. U.S. patent application Ser. No. 17/524,537, titled "SYSTEMS AND METHODS FOR CLASSIFYING A VEHICULAR TRIP AS FOR PERSONAL USE OR FOR WORK BASED UPON DEVIATION IN OPERATION FEATURES";
2. U.S. patent application Ser. No. 17/524,540, titled "SYSTEMS AND METHODS FOR CLASSIFYING A VEHICULAR TRIP AS FOR PERSONAL USE OR FOR WORK BASED UPON SIMILARITY IN OPERATION FEATURES";
3. U.S. patent application Ser. No. 17/524,544, titled "SYSTEMS AND METHODS FOR VALIDATING A VEHICULAR TRIP CLASSIFICATION AS FOR PERSONAL USE OR FOR WORK BASED UPON SIMILARITY IN OPERATION FEATURES";
4. U.S. patent application Ser. No. 17/524,547, titled "SYSTEMS AND METHODS FOR CLASSIFYING A VEHICULAR TRIP AS FOR PERSONAL USE OR FOR WORK BASED UPON DEVIATION IN DEVICE INTERACTION FEATURES";
5. U.S. patent application Ser. No. 17/524,548, titled "SYSTEMS AND METHODS FOR CLASSIFYING A VEHICULAR TRIP AS FOR PERSONAL USE OR FOR WORK BASED UPON SIMILARITY IN DEVICE INTERACTION FEATURES";
6. U.S. patent application Ser. No. 17/524,550, titled "SYSTEMS AND METHODS FOR VALIDATING A VEHICULAR TRIP CLASSIFICATION AS FOR PERSONAL USE OR FOR WORK BASED UPON SIMILARITY IN DEVICE INTERACTION FEATURES";
7. U.S. patent application Ser. No. 17/524,554, titled "SYSTEMS AND METHODS FOR CLASSIFYING A VEHICULAR TRIP AS FOR PERSONAL USE OR FOR WORK BASED UPON CONIC SECTION TRAVEL PATTERN";
8. U.S. patent application Ser. No. 17/524,557, titled "SYSTEMS AND METHODS FOR CLASSIFYING A VEHICULAR TRIP AS FOR PERSONAL USE OR FOR WORK BASED UPON HUB-AND-SPOKES TRAVEL PATTERN"; and
9. U.S. patent application Ser. No. 17/524,560, titled "SYSTEMS AND METHODS FOR CLASSIFYING MULTIPLE TRIP LOCATIONS AS FOR WORK BASED UPON STOPPING PATTERNS".

FIELD OF THE DISCLOSURE

Some embodiments of the present disclosure are directed to management of user information. More particularly, certain embodiments of the present disclosure provide validating a vehicular trip classification as for personal use or for work based upon similarity in device interaction features. Merely by way of example, the present disclosure has been applied to classifying vehicular trips, but it would be recognized that the present disclosure has much broader range of applicability.

BACKGROUND

Generally, an operator of a vehicle may operate the vehicle for personal use or for non-personal use, such as for business use. Such distinction raises the technical problem of classifying driving data to be one of personal or non-personal. The driving data may be collected during one or more vehicular trips associated with a vehicle operator. Such classification may be pertinent or of particular value for domains including insurance and business reporting, such as mileage-based reporting and/or tax-related reporting.

It is with respect to these and other general considerations that embodiments have been described. Also, although relatively specific problems have been discussed, it should be understood that the embodiments should not be limited to solving the specific problems identified in the background.

BRIEF SUMMARY OF THE DISCLOSURE

Some embodiments of the present disclosure are directed to management of user information. More particularly, certain embodiments of the present disclosure provide validating a vehicular trip classification as for personal use or for work based upon similarity in device interaction features. Merely by way of example, the present disclosure has been applied to classifying vehicular trips, but it would be recognized that the present disclosure has much broader range of applicability.

Aspects of the present disclosure relate to a computer-implemented method for classifying a vehicular trip, a system for classifying a vehicular trip, and an non-transitory computer-readable medium storing instructions for classifying a vehicular trip. The computer-implemented method includes a set of operations. The computing system includes one or more processors and a memory storing instructions that, upon execution by the one or more processors, cause the computing system to perform the set of operations. The non-transitory computer-readable medium storing instructions that, upon execution by one or more processors of a computing system, cause the computing system to perform the set of operations. In various aspects, the set of operations for classifying a vehicular trip includes: obtaining a user classification associated with an unlabeled vehicular trip as for work or for personal use; obtaining a first set of historic device interaction data associated with a first set of historic vehicular trips during which a vehicle operator operated a vehicle for work; obtaining a second set of historic device interaction data associated with a second set of historic vehicular trips during which the vehicle operator operated the vehicle for personal use; training a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use; obtaining a set of unlabeled device interaction data associated with the unlabeled vehicular trip; classifying, using the classification model, the unlabeled vehicular trip as for work or for personal use by at least: identifying, based at least in part upon the first set of historic device interaction data, a first set of baseline device interaction features associated with the first set of historic vehicular trips; identifying, based at least in part upon the second set of historic device interaction data, a second set of baseline device interaction features associated with the second set of historic vehicular trips; identifying, based at least in part upon the set of unlabeled device interaction data, a set of representative device interaction features associated with the unlabeled vehicular trip; comparing the set of representative device interaction features against the first set of baseline device interaction features and the second set of baseline device interaction features; and classifying the unlabeled vehicular trip by at least: upon determining that the set of representative device interaction features deviates from the first set of baseline device interaction features less than from the second set of baseline device interaction features, classifying the unlabeled vehicular trip as for work; or upon determining that the set of representative device interaction features deviates from the first set of baseline device interaction features more than from the second set of baseline device interaction features, classifying the unlabeled vehicular trip as for personal use; and validating the user classification based at least in part upon the user classification and the classification made using the classification model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Depending upon the embodiment, one or more benefits may be achieved. These benefits, features, and advantages of the present disclosure can be fully appreciated with reference to the detailed description and accompanying drawings that follow.

BRIEF DESCRIPTION OF THE DRAWINGS

Non-limiting and non-exhaustive examples are described with reference to the following Figures.

DETAILED DESCRIPTION OF THE DISCLOSURE

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Some embodiments of the present disclosure are directed to management of user information. More particularly, certain embodiments of the present disclosure provide validating a vehicular trip classification as for personal use or for work based upon similarity in device interaction features. Merely by way of example, the present disclosure has been applied to classifying vehicular trips, but it would be recognized that the present disclosure has much broader range of applicability.

Figure 1:
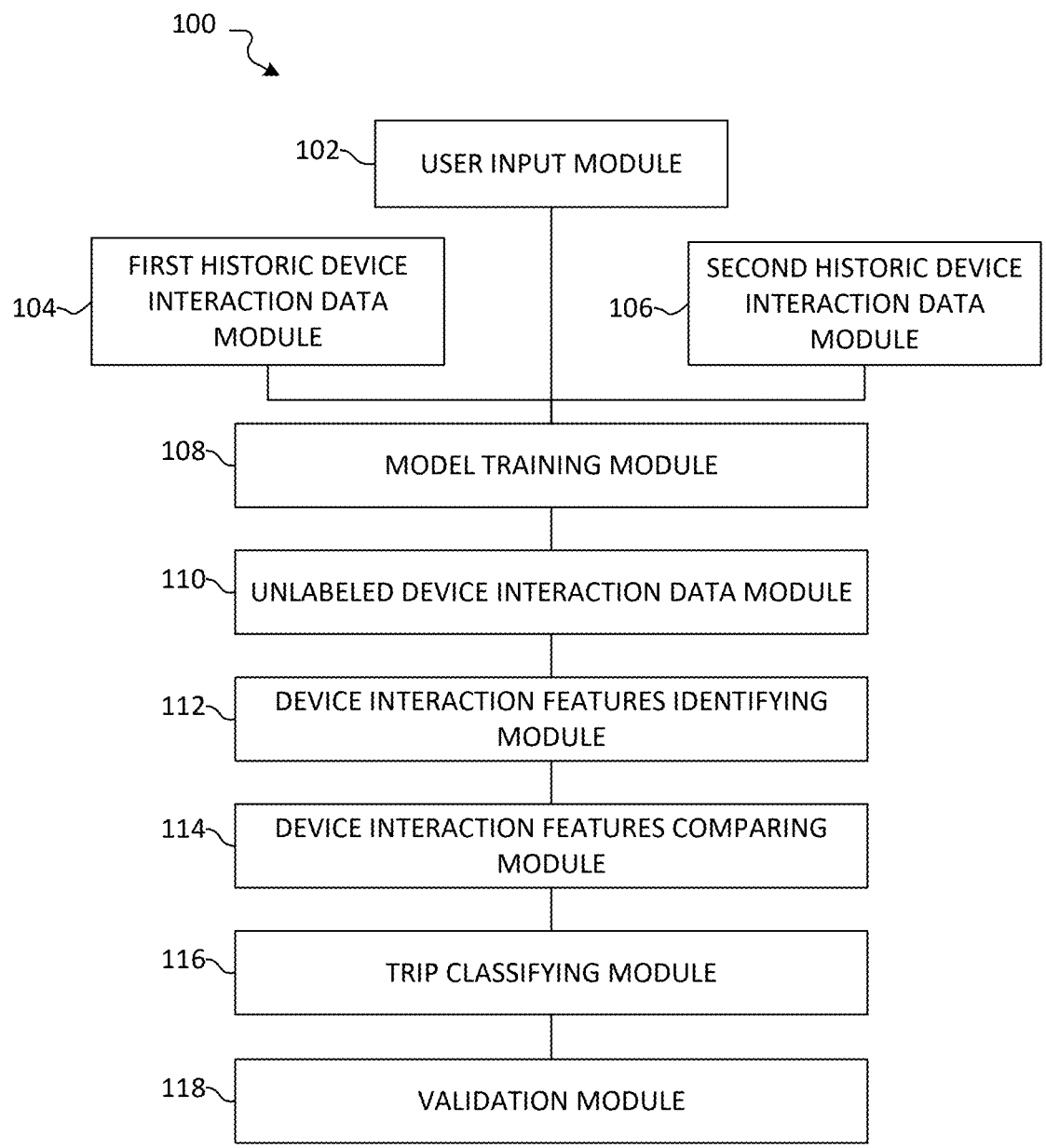
FIG. 1 is a simplified diagram showing a computing system for validating a vehicular trip classification as for personal use or for work based upon similarity in device interaction features according to various embodiments of the present disclosure.

One or More Systems for Validating a Vehicular Trip as for Personal Use or for Work Based Upon Similarity in Device Interaction Features According to Various Embodiments FIG. 1 is a simplified diagram showing a computing system for validating a vehicular trip as for personal use or for work based upon similarity in device interaction features according to various embodiments of the present disclosure. This figure is merely an example, which should not unduly limit the scope of the claims. One of ordinary skill in the art would recognize many variations, alternatives, and modifications. System 100 includes a user input module 102, a first historic device interaction data module 104, a second historic device interaction data module 106, a model training module 108, an unlabeled device interaction data module 110, an device interaction features identifying module 112, an device interaction features comparing module 114, and a trip classifying module 116, and a validation module 118. In certain examples, system 100 is configured to implement method 200 of FIG. 2. In various examples, system 100 includes one or more processors and a memory storing instructions that, upon execution by the one or more processors, cause the computing system to perform a set of operations including the set of operations of method 200. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, module 102 is configured to obtain a user classification associated with an unlabeled vehicular trip as for work or for personal use. In some examples, module 102 is configured to obtain the user classification from a user who may or may not be the vehicle operator, such as via a mobile device associated with the user.

In various embodiments, module 104 is configured to obtain a first set of historic device interaction data associated with a first set of historic vehicular trips during which a vehicle operator operated a vehicle for work. In some examples, the first set of historic device interaction data may be obtained from a database storing historic device interaction data associated with one or more vehicle operators. In certain examples, the database may be maintained by a device interaction data provider or an insurance policy provider. In some examples, the first set of historic device interaction data may be obtained directly from a memory device associated with the vehicle operator (e.g., a mobile phone, a personal computer, a vehicle having an on-board memory).

In various embodiments, module 106 is configured to obtain a second set of historic device interaction data associated with a second set of historic vehicular trips during which the vehicle operator operated the vehicle for personal use. In some examples, the second set of historic device interaction data may be obtained from a database storing historic device interaction data associated with one or more vehicle operators. In certain examples, the database may be maintained by a device interaction data provider or an insurance policy provider. In some examples, the second set of historic device interaction data may be obtained directly from a memory device associated with the vehicle operator (e.g., a mobile phone, a personal computer, a vehicle having an on-board memory).

In various embodiments, module 108 is configured to train a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use.

In various embodiments, module 110 is configured to obtain a set of unlabeled device interaction data associated with an unlabeled vehicular trip during which the vehicle operator operated an unlabeled vehicle. In some examples, the set of unlabeled device interaction data may be obtained from a database storing historic device interaction data associated with one or more vehicle operators. In certain examples, the database may be maintained by a device interaction data provider or an insurance policy provider. In some examples, the set of unlabeled device interaction data may be obtained directly from a memory device associated with the vehicle operator (e.g., a mobile phone, a personal computer, a vehicle having an on-board memory).

In various embodiments, module 112 is configured to identify, based at least in part upon the set of unlabeled device interaction data, a set of representative device interaction features associated with the unlabeled vehicular trip. In some examples, the set of representative device interaction features is indicative of the driving behaviors exhibited by the vehicle operator during the unlabeled vehicular trip. In various examples, module 112 is configured to identify the set of representative device interaction features based on the set of unlabeled device interaction data using a feature identification model trained to identify device interaction features based at least in part upon device interaction data.

In various embodiments, module 112 is configured to identify, based at least in part upon the first set of historic device interaction data, a first set of baseline device interaction features associated with the first set of historic vehicular trips. In some examples, the first set of baseline device interaction features is indicative of the driving behaviors exhibited by the vehicle operator during the first set of historic vehicular trips for work. In some examples, module 112 is configured to identify the first set of baseline device interaction features based on the first set of historic device interaction data using the feature identification model.

In various embodiments, module 112 is configured to identify, based at least in part upon the second set of historic device interaction data, a second set of baseline device interaction features associated with the second set of historic vehicular trips. In some examples, the second set of baseline device interaction features is indicative of the driving behaviors exhibited by the vehicle operator during the second set of historic vehicular trips for personal use. In some examples, module 112 is configured to identify the second set of baseline device interaction features based on the second set of historic device interaction data using the feature identification model.

In various embodiments, module 114 is configured to compare the set of representative device interaction features against the first set of baseline device interaction features. In various examples, module 114 is configured to compare the set of representative device interaction features against the second set of baseline device interaction features. In some examples, the device interaction features may be compared one-by-one, such as one-by-one of the same type. For example, a first representative device interaction feature may be compared against a first baseline device interaction feature, a second representative device interaction feature may be compared against a second baseline device interaction feature, a third representative device interaction feature may be compared against a third baseline device interaction feature.

In various embodiments, module 114 is configured to determine whether the representative features deviates from the first set of baseline features less than from the second set of baseline features. If the determination is "YES", module 116 is configured to classify the unlabeled vehicular trip as for work. If the determination is "NO", module 116 is configured to classify the unlabeled vehicular trip as for personal use. In some examples, module 116 is configured to generate a confidence level associated with the classification made using the classification model.

In various embodiments, module 118 is configured to validate the user classification based at least in part upon the user classification and the classification made using the classification model. In various examples, module 118 is configured to accept the user classification upon determining that the user classification matches the classification made using the classification model. In various examples, module 118 is configured to reject the user classification upon determining that the user classification does not match the classification made using the classification model. In some examples, module 118 is configured to accept the user classification upon determining that the confidence level is less than a confidence threshold. In various examples, module 118 is configured to: obtain a community classification for a set of similar vehicular trips traveled by one or more similar vehicle operators; and accept the user classification upon determining that the user classification matches the classification made using the classification model and the community classification. In some examples, the one or more similar operators share a common employer, a common work region, and/or a common work schedule with the vehicle operator. In some examples, the set of similar vehicular trips have similar travel paths as the unlabeled vehicular trip.

In various embodiments, module 112 is configured to identify, based at least in part upon the first set of baseline device interaction features, a first set of baseline feature vectors associated with the first set of historic vehicular trips. In some examples, module 112 is configured to identify, based at least in part upon the second set of baseline device interaction features, a second set of baseline feature vectors associated with the second set of historic vehicular trips. In some examples, module 112 is configured to identify, based at least in part upon the set of representative device interaction features, a set of representative feature vectors associated with the unlabeled vehicular trip. In some examples, module 114 is configured to map the set of representative feature vectors, the first set of baseline feature vectors, and the second set of baseline feature vectors on a feature space. In some examples, module 114 is configured to determine a first set of vector deviations between the set of representative feature vectors and the first set of baseline feature vectors in the feature space. In some examples, module 114 is configured to determine a second set of vector deviations between the set of representative feature vectors and the second set of baseline feature vectors in the feature space. In some examples, module 116 is configured to, upon determining that the first set of vector deviations is less than the second set of vector deviations, classify the unlabeled vehicular trip as for work. In some examples, module 116 is configured to, upon determining that the first set of vector deviations is more than the second set of vector deviations, classify the unlabeled vehicular trip as for personal use. In various examples, each feature vector represents an device interaction feature in the feature space. For example, a first baseline feature vector may represent a first baseline feature, a second baseline feature vector may represent a second baseline feature, a first representative feature vector may represent a first representative feature, and a second representative feature vector may represent a second representative feature.

In various embodiments, module 114 is configured to determine a first similarity metric based at least in part upon the first set of vector deviations. In some examples, module 114 is configured to determine a second similarity metric based at least in part upon the second set of vector deviations. In some examples, module 116 is configured to classify the unlabeled vehicular trip. In various examples, module 116 is configured to, upon determining that the first similarity metric is more than the second similarity metric, classify the unlabeled vehicular trip as for work. In some examples, module 116 is configured to, upon determining that the first similarity metric is less than the second similarity metric, classify the unlabeled vehicular trip as for personal use. In some examples, module 114 is configured to transform each vector deviation of the set of vector deviations into a mean squared error, and sum up the set of mean squared errors. In various examples, each vector deviation may be represented by a deviation vector connecting two vectors (e.g., a representative feature vector and a baseline feature vector) in a feature space. In some examples, a similarity metric is related to the deviation vectors associated with various device interaction features (e.g., content switching, taking a call, applying gestures, looking at the device, etc.). In some examples, a similarity metric is a distance-based metric representing the special difference between representative feature vector(s) and baseline feature vector(s). In some examples, a similarity metric is normalized into a percentage or a value between zero to unity.

In various embodiments, module 114 is configured to: obtain a set of weights associated with the first set of baseline device interaction features, the second set of baseline device interaction features, and the set of representative device interaction features such that each baseline device interaction feature and an associated representative device interaction feature is assigned with a weight; determine, for each device interaction feature, a multiplication product (e.g., a dot product) by multiplying each vector deviation by an associated weight; and determine the similarity metrics as a weighted similarity metrics based at least in part upon the sum of the multiplication products. For example, a first device interaction feature may be assigned with a first weight, a second device interaction feature may be assigned with a second weight, and a third device interaction feature may be assigned with a third weight, then a similarity metric may be determined by at least determining a first multiplication product by multiplying the first vector deviation associated with the first device interaction feature with the first weight, determining a second multiplication product by multiplying the second vector deviation associated with the second device interaction feature with the second weight, determining a third multiplication product by multiplying the third vector deviation associated with the third device interaction feature with the third weight, and summing the first multiplication product, second multiplication product, and third multiplication product together. The summation of the multiplication products may be normalized into a percentage or a value between zero to unity.

In various embodiments, some device interaction features may be assigned weights higher than others. For example, a first weight may be assigned to the device interaction feature of content switching; a second weight may be assigned to the device interaction feature of entering text; and a third weight may be assigned to the device interaction feature of taking a phone call. The first weight and/or the second weight may be greater than the third weight.

In various embodiments, the weight assigned indicates how important each feature is to the determination of a similarity score. The weight associated with each feature may be fixed, and the weights associated with a set of features may be represented by a weight vector or a weight matrix. The determination of a similarity score between two sets of feature vectors each indicative of device interaction features during one or more vehicular trips, may include multiplying the deviation vectors for a set of device interaction features by the weight vector or a weight matrix. The weights may be fixed and predetermined such that similarity metric may be determined with the same weights for all unlabeled trips.

In various embodiments, determining a deviation includes determining a weighted distance (e.g., vector deviation), such as in terms of weighted mean squared error. This determination may occur for all features at the same step. For example, a first vector representation may be created based on device interaction data and/or device interaction features associated with a set of labeled work trips, a second vector representation may be created based on device interaction data and/or device interaction features associated with a set of labeled personal trips, and a third vector representation may be created based on device interaction data and/or device interaction features associated with a unlabeled trip. The three vector representations may be considered as three points in a high-dimension space where distances or deviations (e.g., mean squared error or a weighted mean squared error) between the representation for the unlabeled trip and the labeled trips may be determined at the same step. Specifically, the mapping of the vector representations may be influenced by the weights such that the distance between the vector representations is a weighted metric. The determined distances may next be compared against a threshold to help classify the unlabeled trip. In various examples, each set of feature vectors may be represented as a point in the feature space (e.g., high-dimension space), such that a distance (e.g., Euclidean distance) between two points may be determined, such as which may then be used to determine a similarity score between two sets of features representing two separation vehicular trip(s).

In various embodiments, system 100 further includes a work insurance module configured to obtain a work insurance claim submitted by the vehicle operator associated with the unlabeled vehicular trip; and determine, based at least in part upon the classification, a claim decision. In various examples, the work insurance module is configured to determine the claim decision as accept claim when the classification is for work. In various examples, the work insurance module is configured to determine the claim decision as reject claim when the classification is for personal use.

In various embodiments, system 100 further includes a personal insurance module configured to obtain a personal insurance claim submitted by the vehicle operator associated with the unlabeled vehicular trip, and determine, based at least in part upon the classification, a claim decision. In various examples, the personal insurance module is configured to determine the claim decision as accept claim when the classification is for personal use. In some examples, the personal insurance module is configured to determine the claim decision as reject claim when the classification is for work.

In various embodiments, system 100 further includes a policy module configured to determine, upon classifying the unlabeled vehicular trip as for work, a set of policy modifications associated with a work insurance policy of the vehicle operator based at least in part upon the set of representative device interaction features. In some examples, the policy module is configured to determine, upon classifying the unlabeled vehicular trip as for personal use, a set of policy modifications associated with a personal insurance policy of the vehicle operator based at least in part upon the set of representative device interaction features. In some examples, the one or more policy modifications includes modify policy premium, modify a risk score, modify an operator behavioral score, modify a policy incentive, issue an reimbursement, and/or modify a device interaction challenge. As an example, upon determining that the vehicle operator exhibited undesirable device interaction behaviors during the unlabeled trip, the premium may increase, risk score may increase, behavioral score may decrease, policy incentive may be reduced, and/or an easier device interaction challenge may be issued.

In various embodiments, system 100 includes a path condition module configured to obtain a first set of historic path conditions associated with the first set of historic vehicular trips, a second set of historic path conditions associated with the second set of historic vehicular trips, and a set of unlabeled path conditions associated with the unlabeled vehicular trip. In some examples, module 112 is configured to calibrate the first set of baseline device interaction features based at least in part upon the first set of historic path conditions. In some examples, module 112 is configured to calibrate the second set of baseline device interaction features based at least in part upon the second set of historic path conditions. In some examples, module 112 is configured to calibrate the set of representative device interaction features based at least in part upon the set of unlabeled path conditions. In various examples, the first set of historic path conditions, the second set of historic path conditions, and/or the set of unlabeled path conditions each include path curvature, path speed limit, average speed by travelers on path, traffic condition, weather condition, and/or time of day.

In various embodiments, module 112 is configured to determine a sequence of representative device interaction features based at least in part upon the set of unlabeled device interaction data. In some examples, module 112 is configured to identify a first sequence of baseline device interaction features based at least in part upon the first set of historic device interaction data. In some examples, module 112 is configured to determine a second sequence of baseline device interaction features based at least in part upon the second set of historic device interaction data. In some examples, module 114 is configured to compare the sequence of representative device interaction features against the first sequence of baseline device interaction features. In some examples, module 114 is configured to compare the sequence of representative device interaction features against the second sequence of baseline device interaction features. In some examples, module 116 is configured to, upon determining that the sequence of representative device interaction features deviates from the first sequence of baseline device interaction features less than from the second sequence of baseline device interaction features, classify the unlabeled vehicular trip as for work. In some examples, module 116 is configured to, upon determining that the sequence of representative device interaction features deviates from the first sequence of baseline device interaction features more than from the second sequence of baseline device interaction features, classify the unlabeled vehicular trip as for personal use.

In various embodiments, module 112 is configured to identify, based at least in part upon the first sequence of baseline device interaction features, a first baseline vector pattern. In some examples, module 112 is configured to identify, based at least in part upon the second sequence of baseline device interaction features, a second baseline vector pattern. In some examples, module 112 is configured to identify, based at least in part upon the sequence of representative device interaction features, a representative vector pattern. In some examples, module 114 is configured to map the first baseline vector pattern, the second baseline vector pattern, and the representative vector pattern on a feature space. In some examples, module 114 is configured to determine a first vector pattern deviation between the first baseline vector pattern and the representative vector pattern in the feature space. In some examples, module 114 is configured to determine a second vector pattern deviation between the second baseline vector pattern and the representative vector pattern in the feature space. In some examples, module 116 is configured to, upon determining that the first vector pattern deviation is less than the second vector pattern deviation, classify the unlabeled vehicular trip as for work. In some examples, module 116 is configured to, upon determining that the first vector pattern deviation is more than the second vector pattern deviation, classify the unlabeled vehicular trip as for personal use.

In various embodiments, the set of baseline device interaction features and the set of representative device interaction features each includes taking a phone call, making a phone call, content switching, content interacting, entering text, interacting with a navigation application, interacting with a communication application, interacting with a vehicle monitoring application, interacting with a delivery application, interacting with a rideshare application, interacting with a finance application (e.g., banking, investment, real estate), interacting with an internet browsing application, interacting with a shopping application, and/or interacting with an entertainment application (e.g., audiobook, podcast, music, music video, video, live stream, gaming). In some examples, the set of baseline device interaction features and the set of representative device interaction features each includes interaction frequency information, interaction duration information, interaction complexity information, and/or interaction method information.

In various embodiments, the vehicle is an automobile, motorcycle, a moped, a watercraft, an aircraft, a scooter, a bicycle, or a hoverboard.

In some examples, a distance-based metric, such as a distance between two sets of features (e.g., each represented by a point in space), may be transformed into a probability, such as by using a logistic regression model. For example, a first deviation distance representative of the difference between device interaction features exhibited during an unlabeled trip and device interaction features exhibited during a set of historic work trips may be transformed into a first probability indicative of how probable the model considers the unlabeled trip as for work. As another example, a second deviation distance representative of the difference between device interaction features exhibited during an unlabeled trip and device interaction features exhibited during a set of historic personal trips may be transformed into a second probability indicative of how probable the model considers the unlabeled trip as for personal use.

Specifically, each set of features may be represented as a point, and the distance between the points may be used as input for a logistic regression model. In some examples, a distance-based metric may be determined by representing a first set of features (e.g., historic work-trip related) as point (a1,a2,a3), and a second set of features (e.g., unlabeled work-trip related) as point (b1,b2,b3). Then a vector deviation may be determined as $((a1-b1)^2, (a2-b2)^2, (a3-b3)^2)$. Using a weights vector (w1, w2, w3), a dot product may be obtained as $w1 \times (a1-b1)^2 + w2 \times (a2-b2)^2 + w3 \times (a3-b3)^2 = scaler$. The Euclidean distance may be obtained via $\sqrt{w1 \times (a1-b1)^2 + w2 \times (a2-b2)^2 + w3 \times (a3-b3)^2} = scaler$.

In other examples, the first deviation distance and the second deviation distance may be fed as input into a transformation model or algorithm that outputs a single probability indicative of how probable the model considers the unlabeled trip as for work. In some examples, a probability threshold may be used such that, if a predicted probability exceeds (and/or equals to) the probability threshold, the model classifies the unlabeled trip as for work. Whereas, if the predicted probability is less than (and/or equal to) the probability threshold, the model classifies the unlabeled trip as for personal use.

Figure 2:
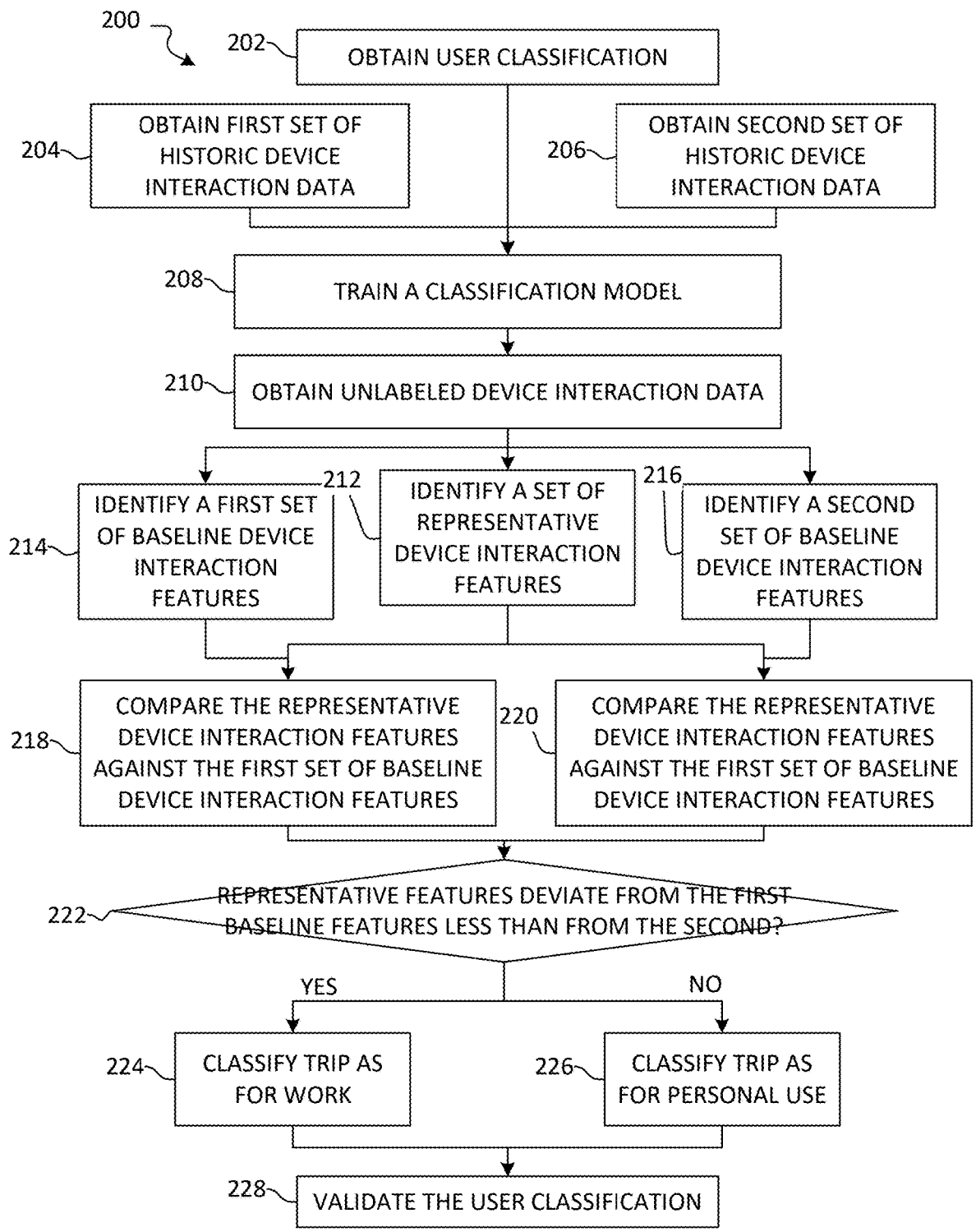
FIG. 2 is a simplified diagram showing a computer-implemented method for validating a vehicular trip classification as for personal use or for work based upon similarity in device interaction features according to various embodiments of the present disclosure.

One or More Methods for Validating a Vehicular Trip as for Personal Use or for Work Based Upon Similarity in Device Interaction Features According to Various Embodiments FIG. 2 is a simplified diagram showing a computer-implemented method for validating a vehicular trip as for personal use or for work based upon similarity in device interaction features according to various embodiments of the present disclosure. This figure is merely an example, which should not unduly limit the scope of the claims. One of ordinary skill in the art would recognize many variations, alternatives, and modifications. Method 200 includes process 202 of obtaining a user classification, process 204 of obtaining a first set of historic device interaction data, process 206 of obtaining a second set of historic device interaction data, process 208 of training a classification model, process 210 of obtaining a set of unlabeled device interaction data, process 212 of identifying a set of representative device interaction features, process 214 of identifying a first set of baseline device interaction features, process 216 of identifying a second set of baseline device interaction features, process 218 of comparing the set of representative device interaction features against the first set of baseline device interaction features, process 220 of comparing the set of representative device interaction features against the second set of baseline device interaction features, process 222 of determining whether the representative features deviates from the first set of baseline features less than from the second set of baseline features, process 224 of classifying the unlabeled vehicular trip as for work, process 226 of classifying the unlabeled vehicular trip as for personal use, and process 228 of validating the user classification. In certain examples, method 200 is configured to be implemented by system 100 of FIG. 1. Although the above has been shown using a selected group of operations for the method, there can be many alternatives, modifications, and variations. In some examples, some of the operations may be expanded and/or combined. Other operations may be inserted to those noted above. Depending upon the embodiment, the sequence of operations may be interchanged with others replaced. In some examples, some or all operations of the method are performed by a computing system or a processor directed by instructions stored in memory. As an example, some or all operations of the method are performed according to instructions stored in a non-transitory computer-readable medium.

In various embodiments, process 202 includes obtaining a user classification associated with an unlabeled vehicular trip as for work or for personal use. In some examples, process 202 includes obtaining the user classification from a user who may or may not be the vehicle operator, such as via a mobile device associated with the user.

In various embodiments, process 204 includes obtaining a first set of historic device interaction data associated with a first set of historic vehicular trips during which a vehicle operator operated a vehicle for work. In some examples, the first set of historic device interaction data may be obtained from a database storing historic device interaction data associated with one or more vehicle operators. In certain examples, the database may be maintained by a device interaction data provider or an insurance policy provider. In some examples, the first set of historic device interaction data may be obtained directly from a memory device associated with the vehicle operator (e.g., a mobile phone, a personal computer, a vehicle having an on-board memory).

In various embodiments, process 206 includes obtaining a second set of historic device interaction data associated with a second set of historic vehicular trips during which the vehicle operator operated the vehicle for personal use. In some examples, the second set of historic device interaction data may be obtained from a database storing historic device interaction data associated with one or more vehicle operators. In certain examples, the database may be maintained by a device interaction data provider or an insurance policy provider. In some examples, the second set of historic device interaction data may be obtained directly from a memory device associated with the vehicle operator (e.g., a mobile phone, a personal computer, a vehicle having an on-board memory).

In various embodiments, process 208 includes training a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use.

In various embodiments, process 210 includes obtaining a set of unlabeled device interaction data associated with an unlabeled vehicular trip during which the vehicle operator operated an unlabeled vehicle. In some examples, the set of unlabeled device interaction data may be obtained from a database storing historic device interaction data associated with one or more vehicle operators. In certain examples, the database may be maintained by a device interaction data provider or an insurance policy provider. In some examples, the set of unlabeled device interaction data may be obtained directly from a memory device associated with the vehicle operator (e.g., a mobile phone, a personal computer, a vehicle having an on-board memory).

In various embodiments, process 212 includes identifying, based at least in part upon the set of unlabeled device interaction data, a set of representative device interaction features associated with the unlabeled vehicular trip. In some examples, the set of representative device interaction features is indicative of the driving behaviors exhibited by the vehicle operator during the unlabeled vehicular trip. In various examples, the identification of the set of representative device interaction features based on the set of unlabeled device interaction data may be performed using a feature identification model trained to identify device interaction features based at least in part upon device interaction data.

In various embodiments, process 214 includes identifying, based at least in part upon the first set of historic device interaction data, a first set of baseline device interaction features associated with the first set of historic vehicular trips. In some examples, the first set of baseline device interaction features is indicative of the driving behaviors exhibited by the vehicle operator during the first set of historic vehicular trips for work. In some examples, the identification of the first set of baseline device interaction features based on the first set of historic device interaction data may be performed using the feature identification model.

In various embodiments, process 216 includes identifying, based at least in part upon the second set of historic device interaction data, a second set of baseline device interaction features associated with the second set of historic vehicular trips. In some examples, the second set of baseline device interaction features is indicative of the driving behaviors exhibited by the vehicle operator during the second set of historic vehicular trips for personal use. In some examples, the identification of the second set of baseline device interaction features based on the second set of historic device interaction data may be performed using the feature identification model.

In various embodiments, process 218 includes comparing the set of representative device interaction features against the first set of baseline device interaction features. In various examples, process 220 includes comparing the set of representative device interaction features against the second set of baseline device interaction features. In some examples, the device interaction features may be compared one-by-one, such as one-by-one of the same type. For example, a first representative device interaction feature may be compared against a first baseline device interaction feature, a second representative device interaction feature may be compared against a second baseline device interaction feature, a third representative device interaction feature may be compared against a third baseline device interaction feature.

In various embodiments, process 222 includes determining whether the representative features deviates from the first set of baseline features less than from the second set of baseline features. If the determination is "YES", the method flows to process 224 of classifying the unlabeled vehicular trip as for work. If the determination is "NO", the method flows to process 226 of classifying the unlabeled vehicular trip as for personal use. In some examples, classifying the unlabeled vehicular trip includes generating a confidence level associated with the classification made using the classification model.

In various embodiments, process 228 includes validating the user classification based at least in part upon the user classification and the classification made using the classification model. In various examples, process 228 includes accepting the user classification upon determining that the user classification matches the classification made using the classification model. In various examples, process 228 includes rejecting the user classification upon determining that the user classification does not match the classification made using the classification model. In some examples, process 228 includes accepting the user classification upon determining that the confidence level is less than a confidence threshold. In various examples, validating the user classification includes: obtaining a community classification for a set of similar vehicular trips traveled by one or more similar vehicle operators; and accepting the user classification upon determining that the user classification matches the classification made using the classification model and the community classification. In some examples, the one or more similar operators share a common employer, a common work region, and/or a common work schedule with the vehicle operator. In some examples, the set of similar vehicular trips have similar travel paths as the unlabeled vehicular trip.

In various embodiments, classifying the unlabeled vehicular trip includes: identifying, based at least in part upon the first set of baseline device interaction features, a first set of baseline feature vectors associated with the first set of historic vehicular trips; identifying, based at least in part upon the second set of baseline device interaction features, a second set of baseline feature vectors associated with the second set of historic vehicular trips; identifying, based at least in part upon the set of representative device interaction features, a set of representative feature vectors associated with the unlabeled vehicular trip; mapping the set of representative feature vectors, the first set of baseline feature vectors, and the second set of baseline feature vectors on a feature space; determining a first set of vector deviations between the set of representative feature vectors and the first set of baseline feature vectors in the feature space; determining a second set of vector deviations between the set of representative feature vectors and the second set of baseline feature vectors in the feature space; and classifying the unlabeled vehicular trip. In some examples, classifying the unlabeled vehicular trip includes, upon determining that the first set of vector deviations is less than the second set of vector deviations, classifying the unlabeled vehicular trip as for work. In some examples, classifying the unlabeled vehicular trip includes, upon determining that the first set of vector deviations is more than the second set of vector deviations, classifying the unlabeled vehicular trip as for personal use. In various examples, each feature vector represents an device interaction feature in the feature space. For example, a first baseline feature vector may represent a first baseline feature, a second baseline feature vector may represent a second baseline feature, a first representative feature vector may represent a first representative feature, and a second representative feature vector may represent a second representative feature.

In various embodiments, method 200 further includes determining a first similarity metric based at least in part upon the first set of vector deviations, determining a second similarity metric based at least in part upon the second set of vector deviations, and classifying the unlabeled vehicular trip. In various examples, classifying the unlabeled vehicular trip includes, upon determining that the first similarity metric is more than the second similarity metric, classifying the unlabeled vehicular trip as for work. In various examples, classifying the unlabeled vehicular trip includes, upon determining that the first similarity metric is less than the second similarity metric, classifying the unlabeled vehicular trip as for personal use. In some examples, determining the similarity metric includes transforming each vector deviation of the set of vector deviations into an mean squared error, and summing up the set of mean squared errors. In various examples, each vector deviation may be represented by a deviation vector connecting two vectors (e.g., a representative feature vector and a baseline feature vector) in a feature space. In some examples, a similarity metric is related to the deviation vectors associated with various device interaction features (e.g., content switching, taking a call, applying gestures, looking at the device, etc.). In some examples, a similarity metric is a distance-based metric representing the special difference between representative feature vector(s) and baseline feature vector(s). In some examples, a similarity metric is normalized into a percentage or a value between zero to unity.

In various embodiments, determining the similarity metric includes: obtaining a set of weights associated with the first set of baseline device interaction features, the second set of baseline device interaction features, and the set of representative device interaction features such that each baseline device interaction feature and an associated representative device interaction feature is assigned with a weight; determining, for each device interaction feature, a multiplication product by multiplying each vector deviation by an associated weight; and determining the similarity metrics as a weighted similarity metrics based at least in part upon the sum of the multiplication products. For example, a first device interaction feature may be assigned with a first weight, a second device interaction feature may be assigned with a second weight, and a third device interaction feature may be assigned with a third weight, then a similarity metric may be determined by at least determining a first multiplication product by multiplying the first vector deviation associated with the first device interaction feature with the first weight, determining a second multiplication product by multiplying the second vector deviation associated with the second device interaction feature with the second weight, determining a third multiplication product by multiplying the third vector deviation associated with the third device interaction feature with the third weight, and summing the first multiplication product, second multiplication product, and third multiplication product together. The summation of the multiplication products may be normalized into a percentage or a value between zero to unity.

In various embodiments, some device interaction features may be assigned weights higher than others. For example, a first weight may be assigned to the device interaction feature of content switching; a second weight may be assigned to the device interaction feature of entering text; and a third weight may be assigned to the device interaction feature of taking a phone call. The first weight and/or the second weight may be greater than the third weight.

In various embodiments, the weight assigned indicates how important each feature is to the determination of a similarity score. The weight associated with each feature may be fixed, and the weights associated with a set of features may be represented by a weight vector or a weight matrix. The determination of a similarity score between two sets of feature vectors each indicative of device interaction features during one or more vehicular trips, may include multiplying the deviation vectors for a set of device interaction features by the weight vector or a weight matrix. The weights may be fixed and predetermined such that similarity metric may be determined with the same weights for all unlabeled trips.

In various embodiments, determining a deviation includes determining a weighted distance (e.g., vector deviation), such as in terms of weighted mean squared error. This determination may occur for all features at the same step. For example, a first vector representation may be created based on device interaction data and/or device interaction features associated with a set of labeled work trips, a second vector representation may be created based on device interaction data and/or device interaction features associated with a set of labeled personal trips, and a third vector representation may be created based on device interaction data and/or device interaction features associated with a unlabeled trip. The three vector representations may be considered as three points in a high-dimension space where distances or deviations (e.g., mean squared error or a weighted mean squared error) between the representation for the unlabeled trip and the labeled trips may be determined at the same step. Specifically, the mapping of the vector representations may be influenced by the weights such that the distance between the vector representations is a weighted metric. The determined distances may next be compared against a threshold to help classify the unlabeled trip. In various examples, each set of feature vectors may be represented as a point in the feature space (e.g., high-dimension space), such that a distance (e.g., Euclidean distance) between two points may be determined, such as which may then be used to determine a similarity score between two sets of features representing two separation vehicular trip(s).

In various embodiments, method 200 further includes obtaining a work insurance claim submitted by the vehicle operator associated with the unlabeled vehicular trip; and determining, based at least in part upon the classification, a claim decision. In various examples, determining the claim decision includes determining the claim decision as accept claim when the classification is for work. In various examples, determining the claim decision includes determining the claim decision as reject claim when the classification is for personal use.

In various embodiments, method 200 further includes obtaining a personal insurance claim submitted by the vehicle operator associated with the unlabeled vehicular trip, and determining, based at least in part upon the classification, a claim decision. In various examples, determining the claim decision includes determining the claim decision as accept claim when the classification is for personal use. In various examples, determining the claim decision includes determining the claim decision as reject claim when the classification is for work.

In various embodiments, method 200 further includes determining, upon classifying the unlabeled vehicular trip as for work, a set of policy modifications associated with a work insurance policy of the vehicle operator based at least in part upon the set of representative device interaction features. method 200 further includes determining, upon classifying the unlabeled vehicular trip as for personal use, a set of policy modifications associated with a personal insurance policy of the vehicle operator based at least in part upon the set of representative device interaction features. In some examples, the one or more policy modifications includes modify policy premium, modify a risk score, modify an operator behavioral score, modify a policy incentive, issue an reimbursement, and/or modify a device interaction challenge. As an example, upon determining that the vehicle operator exhibited undesirable device interaction behaviors during the unlabeled trip, the premium may increase, risk score may increase, behavioral score may decrease, policy incentive may be reduced, and/or an easier device interaction challenge may be issued.

In various embodiments, method 200 further includes obtaining a first set of historic path conditions associated with the first set of historic vehicular trips, a second set of historic path conditions associated with the second set of historic vehicular trips, and obtaining a set of unlabeled path conditions associated with the unlabeled vehicular trip. In some examples, identifying the first set of baseline device interaction features includes calibrating the first set of baseline device interaction features based at least in part upon the first set of historic path conditions. In some examples, identifying the second set of baseline device interaction features includes calibrating the second set of baseline device interaction features based at least in part upon the second set of historic path conditions. In some examples, identifying the set of representative device interaction features includes calibrating the set of representative device interaction features based at least in part upon the set of unlabeled path conditions. In various examples, the first set of historic path conditions, the second set of historic path conditions, and/or the set of unlabeled path conditions each include path curvature, path speed limit, average speed by travelers on path, traffic condition, weather condition, and/or time of day.

In various embodiments, process 212 of identifying the set of representative device interaction features includes identifying a sequence of representative device interaction features based at least in part upon the set of unlabeled device interaction data. In some examples, process 214 of identifying the first set of baseline device interaction features includes identifying a first sequence of baseline device interaction features based at least in part upon the first set of historic device interaction data. In some examples, process 216 of identifying the second set of baseline device interaction features includes identifying a second sequence of baseline device interaction features based at least in part upon the second set of historic device interaction data. In some examples, process 218 of comparing the set of representative device interaction features against the first set of baseline device interaction features includes comparing the sequence of representative device interaction features against the first sequence of baseline device interaction features. In some examples, process 220 of comparing the set of representative device interaction features against the second set of baseline device interaction features includes comparing the sequence of representative device interaction features against the second sequence of baseline device interaction features. In some examples, process 224 includes, upon determining that the sequence of representative device interaction features deviates from the first sequence of baseline device interaction features less than from the second sequence of baseline device interaction features, classifying the unlabeled vehicular trip as for work. In some examples, process 226 includes, upon determining that the sequence of representative device interaction features deviates from the first sequence of baseline device interaction features more than from the second sequence of baseline device interaction features, classifying the unlabeled vehicular trip as for personal use.

In various embodiments, classifying the unlabeled vehicular trip further includes: identifying, based at least in part upon the first sequence of baseline device interaction features, a first baseline vector pattern; identifying, based at least in part upon the second sequence of baseline device interaction features, a second baseline vector pattern; identifying, based at least in part upon the sequence of representative device interaction features, a representative vector pattern; mapping the first baseline vector pattern, the second baseline vector pattern, and the representative vector pattern on a feature space; determining a first vector pattern deviation between the first baseline vector pattern and the representative vector pattern in the feature space; determining a second vector pattern deviation between the second baseline vector pattern and the representative vector pattern in the feature space; and classifying the unlabeled vehicular trip. In various examples, classifying the unlabeled vehicular trip includes, upon determining that the first vector pattern deviation is less than the second vector pattern deviation, classifying the unlabeled vehicular trip as for work. In various examples, classifying the unlabeled vehicular trip includes, upon determining that the first vector pattern deviation is more than the second vector pattern deviation, classifying the unlabeled vehicular trip as for personal use.

In various embodiments, the set of baseline device interaction features and the set of representative device interaction features each includes taking a phone call, making a phone call, content switching, content interacting, entering text, interacting with a navigation application, interacting with a communication application, interacting with a vehicle monitoring application, interacting with a delivery application, interacting with a rideshare application, interacting with a finance application (e.g., banking, investment, real estate), interacting with an internet browsing application, interacting with a shopping application, and/or interacting with an entertainment application (e.g., audiobook, podcast, music, music video, video, live stream, gaming). In some examples, the set of baseline device interaction features and the set of representative device interaction features each includes interaction frequency information, interaction duration information, interaction complexity information, and/or interaction method information.

In various embodiments, the vehicle is an automobile, motorcycle, a moped, a watercraft, an aircraft, a scooter, a bicycle, or a hoverboard.

In some examples, a distance-based metric, such as a distance between two sets of features (e.g., each represented by a point in space), may be transformed into a probability, such as by using a logistic regression model. For example, a first deviation distance representative of the difference between device interaction features exhibited during an unlabeled trip and device interaction features exhibited during a set of historic work trips may be transformed into a first probability indicative of how probable the model considers the unlabeled trip as for work. As another example, a second deviation distance representative of the difference between device interaction features exhibited during an unlabeled trip and device interaction features exhibited during a set of historic personal trips may be transformed into a second probability indicative of how probable the model considers the unlabeled trip as for personal use.

Specifically, each set of features may be represented as a point, and the distance between the points may be used as input for a logistic regression model. In some examples, a distance-based metric may be determined by representing a first set of features (e.g., historic work-trip related) as point (a1,a2,a3), and a second set of features (e.g., unlabeled work-trip related) as point (b1,b2,b3). Then a vector deviation may be determined as $((a1-b1)^2, (a2-b2)^2, (a3-b3)^2)$. Using a weights vector (w1, w2, w3), a dot product may be obtained as $w1 \times (a1-b1)^2 + w2 \times (a2-b2)^2 + w3 \times (a3-b3)^2 =$ scaler. The Euclidean distance may be obtained via $\sqrt{w1 \times (a1-b1)^2 + w2 \times (a2-b2)^2 + w3 \times (a3-b3)^2} =$ scaler.

In other examples, the first deviation distance and the second deviation distance may be fed as input into a transformation model or algorithm that outputs a single probability indicative of how probable the model considers the unlabeled trip as for work. In some examples, a probability threshold may be used such that, if a predicted probability exceeds (and/or equals to) the probability threshold, the model classifies the unlabeled trip as for work. Whereas, if the predicted probability is less than (and/or equal to) the probability threshold, the model classifies the unlabeled trip as for personal use.

One or More Computing Devices According to Various Embodiments

Figure 3:
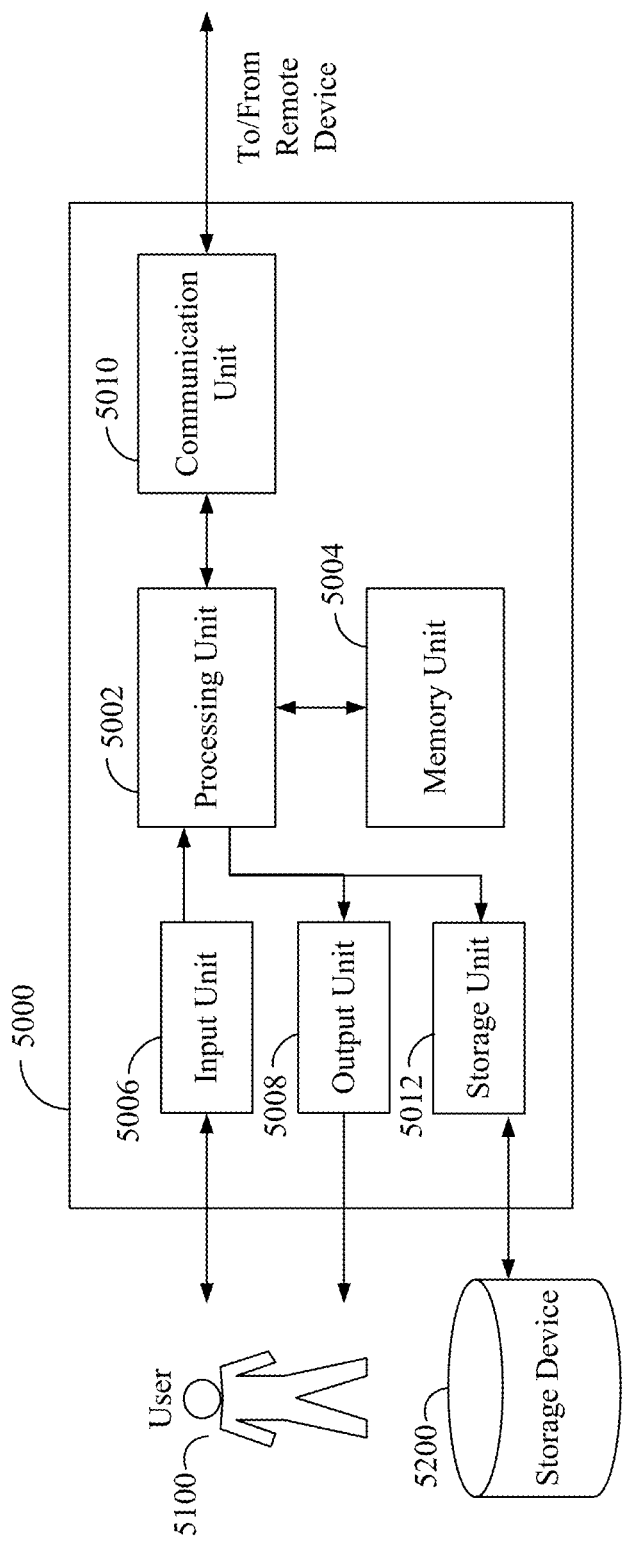
FIG. 3 is a simplified diagram showing a computing device, according to various embodiments of the present disclosure.

FIG. 3 is a simplified diagram showing a computing device 5000, according to various embodiments of the present disclosure. This figure is merely an example, which should not unduly limit the scope of the claims. One of ordinary skill in the art would recognize many variations, alternatives, and modifications. In some examples, the computing device 5000 includes a processing unit 5002, a memory unit 5004, an input unit 5006, an output unit 5008, and a communication unit 5010. In various examples, the computing device 5000 is configured to be in communication with a user 5100 and/or a storage device 5200. In certain examples, the system computing device 5000 is configured according to system 100 of FIG. 1 and/or to implement method 200 of FIG. 2. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 200 of FIG. 2. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more operations described herein. In certain examples, an operation may be general or specific to a particular programming language (e.g., C, C#, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, 5G, NFC, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computing device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computing system Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computing device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Computing Systems According to Various Embodiments

Figure 4:
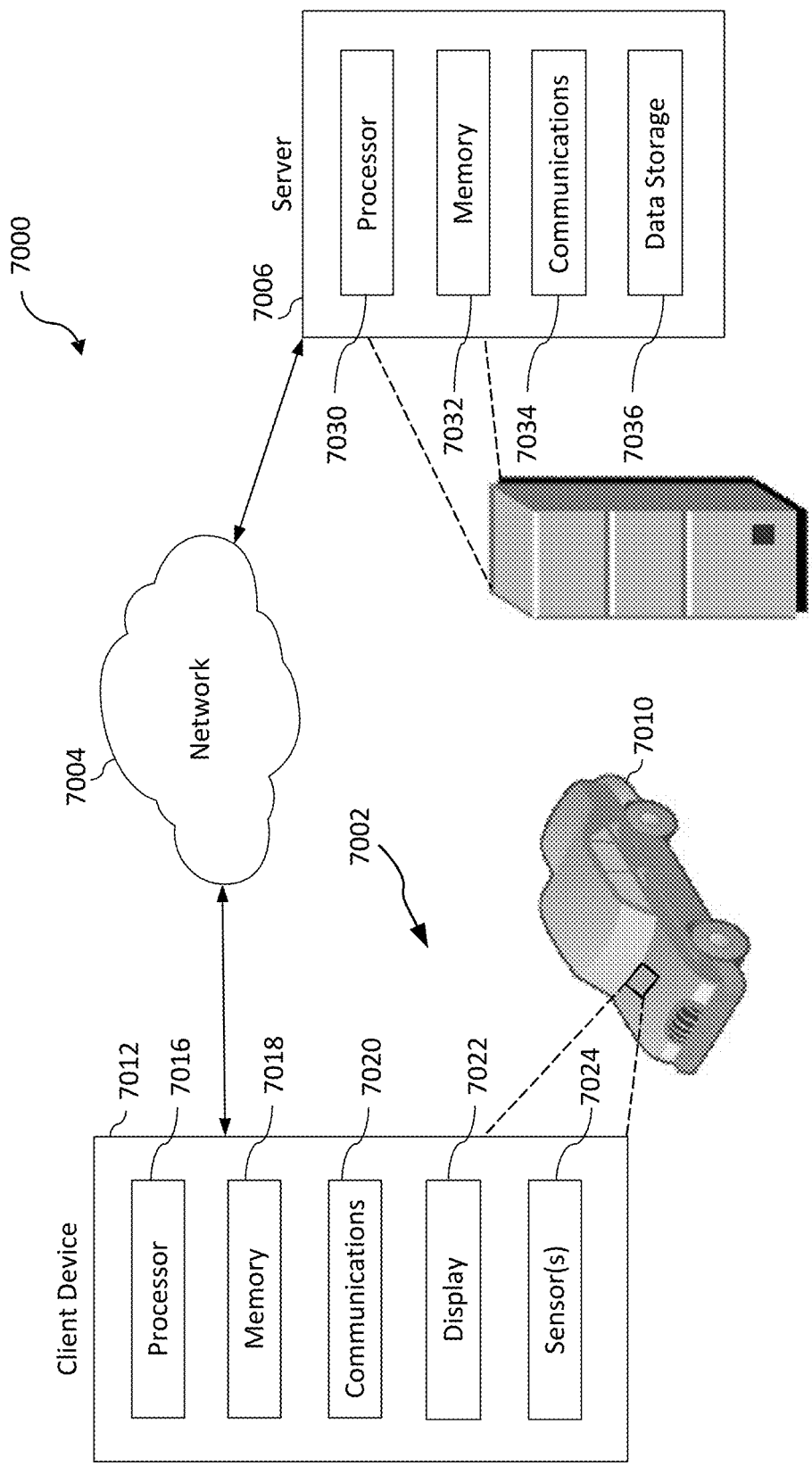
FIG. 4 is a simplified diagram showing a computing system, according to various embodiments of the present disclosure.

FIG. 4 is a simplified computing system 7000 according to various embodiments of the present disclosure. This figure is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured according to system 100 of FIG. 1 and/or to implement method 200 of FIG. 2. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes a processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more vehicle trips, the vehicle 7010 by at least collecting data associated with one or more operating parameters of the vehicle, such as speed, speeding, braking, location, engine status, and/or other suitable parameters. In certain examples, the collected data include vehicle telematics data. According to some embodiments, the data are collected continuously, at predetermined time intervals, and/or based on one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes a processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by the processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012, and stores the data in the data storage 7036. In some examples, the server 7006 is further configured to process, via the processor 7030, the data to perform one or more operations of the methods of the present disclosure.

Examples of Certain Embodiments of the Present Disclosure

In various embodiments, aspects of the present disclosure relate to classifying vehicular trips as for personal use or for work (e.g., business use). In various examples, aspects of the present disclosure relate to classifying vehicular trips to be one of two possible classifications. For example, a vehicular trip may be classified to be either for personal purposes or for business purposes.

In various embodiments, vehicular trips may be traveled with an automobile (e.g., car, utility vehicle, van, truck), motorcycle, a moped, a watercraft (e.g., boat, ship, jet ski, kayak, paddleboard), an aircraft (airplane, helicopter, passenger drone), a scooter, a bicycle, a hoverboard. In some examples, vehicular trips may be traveled with any vehicle capable of carrying passengers. In certain examples, vehicle trips may be traveled by a vehicle operated by an operator, such as a human operator. In some examples, vehicle trips may be traveled by a vehicle operated autonomously (e.g., semi-autonomously or fully autonomously), such as under one of the six autonomous driving levels.

In various embodiments, aspects of the present disclosure relate to, upon classifying vehicular trips as for personal use or for work and based on said classifications, determining and/or applying modifications to an insurance policy (e.g., policy premium, operator information, policy inventive), verifying and/or accepting an insurance claim, determining whether an operator input (e.g., claim request, trip classification, trip information) is true or false, determining and/or providing operator guidance for improving operational behaviors, and/or generating tailored challenges to one or more vehicle operators.

As an example, an insurance policy issuer may determine, based at least in part upon trip classifications associated with an insured, recommendations on operational characteristics that the insured may improve upon to reduce his/her policy premium. Specifically, the recommendations may be determined based at least in part upon behavioral differences exhibited by the operator between personal trips and work trips. Work trips may also be referred to as business trips and may be associated with trips where the operator may earn salary or wages by operation a vehicle. For example, a recommendation may be to encourage an operator to drive his/her personal trips more similarly to how he/she operates a vehicle for work trips, such as to operate at slower speed, with less sudden acceleration or braking, with gradual acceleration or braking, with smaller turning radius, and/or with fewer lane changes.

In various embodiments, aspects of the present disclosure relate to classifying vehicular trips associated with one or more vehicles operated by one or more operators. As an example, aspects of the present disclosure relate to classifying vehicular trips associated with multiple vehicles operated by the same operator. As another example, aspects of the present disclosure relate to classifying vehicular trips associated with a single vehicle operated by a single operator. As another example, aspects of the present disclosure relate to classifying vehicular trips associated with multiple vehicles each operated by a different operator.

In various embodiments, aspects of the present disclosure relate to classifying vehicular trips based at least in part upon one or more operation behaviors including acceleration, braking, cornering, lane changes, speed compared to speed limit, steering, magnitude of jerk, magnitude of swerve, and/or distraction (e.g., duration, frequency, situation). As an example, an operator may operate a vehicle more carefully and safely when for business compared to for personal purposes.

In various embodiments, aspects of the present disclosure relate to classifying vehicular trips based at least in part upon one or more operation behaviors calibrated or normalized based at least in part upon road conditions including curvature, speed limit, average speed by operators, traffic, and/or weather (e.g., snow, rain, fog, dry). As an example, operation behaviors may be scored relative to other operators taking similar vehicular trips. As another example, operation behaviors may be scored according to one or more score modifiers associated with road conditions associated with the vehicular trips. Operation behaviors may also be referred to as operation characteristics or operation features.

In various embodiments, aspects of the present disclosure relate to classifying vehicular trips based at least in part upon weighted operation characteristics. In some examples, each operation characteristics may be assigned a weight such that operation characteristics assigned with higher weights would impact the classification of a vehicular trip more than operation characteristics assigned with lower weights. As an example, braking and/or distraction may be characteristics assigned with higher weights. In some examples, distraction may include phone use, which may be a primary characteristic for differentiating personal use and business use. As an example, a rideshare operator may interact with a mobile device more when operating a vehicle for business use than when operating a vehicle for personal use.

In various embodiments, aspects of the present disclosure relate to classifying vehicular trips based further upon travel pattern including time of day, day of week, and/or recurring route. As an example, vehicular trips traveled during working hours and working days may be attributed to having a higher likelihood of being for work.

In various embodiments, aspects of the present disclosure relate to classifying vehicular trips using one or more decision-tree-based classification models. In various examples, the one or more decision-tree-based classification models may use weights associated with operation characteristics.

In various embodiments, aspects of the present disclosure relate to classifying a vehicular trip using one or more distance-based (e.g., Euclidean distance-based) classification models (e.g., K-Nearest Neighbor (KNN), Support Vector Machines (SVM)). Other aspects of the present disclosure relate to classifying a vehicular trip using one or more probabilistic-based classification models (e.g., a logistic regression classifier), which may have an objective function of cross-entropy or log likelihood.

In various embodiments, aspects of the present disclosure relate to classifying vehicular trips by at least comparing operation characteristics as features. In some examples, features may be represented as vectors and each vehicular trip may be associated with a set of vectors associated with a set of operation characteristics. In some examples, vectors from different vehicular trips are compared, such as against one or more baseline vectors associated with an operator profile.

In various embodiments, aspects of the present disclosure relate to determining, based at least in part upon telematics data, one or more baseline vectors indicative of one or more operation characteristics an operator exhibited during one or more historic vehicular trips. In some examples, the one or more baseline vectors includes a first set of representative indicative of a first set of operation characteristics the operator exhibited during a set of historic business vehicular trips. In some examples, the one or more baseline vectors includes a second set of representative indicative of a second set of operation characteristics the operator exhibited during a set of historic personal vehicular trips.

In various embodiments, aspects of the present disclosure relate to determining, based at least in part upon telematics data, a set of representative vectors indicative of a third set of operation characteristics an operator exhibited during one or more recent vehicular trips. In various examples, aspects of the present disclosure further relate to comparing the set of representative vectors against the first set of baseline vectors to determine a first similarity metric. In various examples, aspects of the present disclosure further relate to comparing the set of representative vectors against the second set of baseline vectors to determine a second similarity metric. In various examples, aspects of the present disclosure further relate to determining whether the one or more recent vehicular trips is for business or for personal use based at least in part upon the first similarity metric and the second similarity metric.

In various embodiments, determining a similarity metric includes determining the deviation between the set of representative vectors from the first set of baseline vectors or from the second set of baseline vectors in a feature vector map. For example, aspects of the present disclosure relate to determining, for each operation characteristic, a deviation (e.g., in shortest distance or squared thereof in the feature space) between a baseline vector (e.g., one representing a historic performance for the operation characteristic) and a representative vector (e.g., one representing a recent performance for the operation characteristic). In some examples, the deviations may be represented as a percentage or an absolute value indicative how different each representative vector is from its associated baseline vector.

In various examples, aspects of the present disclosure relate to determining the similarity metric based at least in part upon a set of deviations for a set of operation characteristics. In some examples, determining the similarity metric includes adding up the deviations, such as according to a set of predetermined weights or modifiers. For example, a first deviation associated with a first operation characteristic (e.g., braking) may be assigned with a first weight, a second deviation associated with a second operation characteristic (e.g., focus) may be assigned with a second weight, a third deviation associated with a third operation characteristic (e.g., steering) may be assigned with a third weight, and so on and so forth. The similarity metric may then be determined by at least multiplying each deviation (e.g., as an percentage or an absolute value) with its associated assigned weight, and summing up the products of the multiplications.

In various examples, aspects of the present disclosure relate to identifying one or more sequences of driving behaviors as a function of time. In some examples, a sequence of driving behaviors may be represented as a set of vectors in the feature map, where each vector of the set of vectors having an associated time. In some examples, aspects of the present disclosure relate to identifying a set of representative vectors and a representative vector pattern associated with a set of recent driving behaviors or characteristics. In certain examples, a baseline vector pattern associated with a set of historic driving behaviors or characteristics may also be determined. In various examples, aspects of the present disclosure relate to classifying one or more vehicular trips based at least in part upon determining a deviation between the representative vector pattern and the baseline vector pattern.

In various embodiments, a classification model according to aspects of the present disclosure may be configured to determine whether a vehicle operator mischaracterized about the classification of a vehicular trip. For example, the classification model may determine, such as by comparing recent telematics data with historic behaviors, a predicted classification for a vehicular trip. The classification model may further receive an user-classification for the vehicular trip, and determine whether the user mischaracterized the vehicular trip by at least comparing the classification prediction against the user-classification. In some examples, the classification model may be configured to keep count of how many times an operator has mischaracterized. In certain examples, the classification model may flag an operator as untrustworthy when the count goes beyond a predetermined threshold.

In various embodiments, user classifications of vehicular trips may be used to help improve the classification model, such as when the classification predictions generated by the classification model are associated with a low confidence level. For example, When the classification model generates a classification prediction with a low confidence level for a vehicular trip (e.g., due to too great of a deviation in operation characteristics between the recent and historic vehicular trips), an user classification may be used instead of the classification prediction and the classification model may self-improve by modifying one or more weights and/or biases such that with the same input (e.g., telematics data), the classification model may generate a classification prediction equal to the user-classification.

In various embodiments, aspects of the present disclosure relate to training the classification model using telematics data and user classifications associated with vehicular trips of higher relevance. For example, vehicular trips of higher relevance may include repeating vehicular trips, vehicular trips occurring during working hours and/or days, and/or vehicular trips during which an associated vehicle operator exhibited operation behaviors similar to operation behaviors the operator has exhibited historically. In some examples, vehicular trips of higher relevance may include vehicular trips operated by vehicle operators with established operation history indicative of the user's trustworthiness in user-reported classifications.

In various embodiments, aspects of the present disclosure relate to training the classification model using telematics data and user classifications associated with multiple vehicle operators of the same group. In some examples, vehicle operators of the same group may reside and/or work in the same location (e.g., zip code(s)), in the same age group, have the same employer, and/or have similar historic travel patterns. In various examples, aspects of the present disclosure may relate to training and providing a classification for each vehicle operator based at least in part upon telematics data and trip classifications (e.g., operator-provided or verified classification predictions) associated with each vehicle operator. In certain examples, aspects of the present disclosure may relate to training and providing a classification for each vehicle operator based at least in part upon telematics data and associated trip classifications (e.g., operator-provided or verified classification predictions) associated with vehicle operators of the same group with each vehicle operator.

In various embodiments, aspects of the present disclosure relate to classifying a vehicular trip by at least segmenting the vehicular trip into a set of segments, such as by time. For example, a vehicular trip may be segmented into a set of segments such that each segment is of a certain time duration (e.g., 1 minute, 5 minute, 15 minute, etc.). In some examples, each segment may be classified as for business use or for personal use, and an overall classification for the trip may be determined based at least in part upon the classifications for the segments. As an example, when there are more segments predicted as for business use than there are segments predicted as for personal use, the overall classification is predicted to be for business use. Similarly, when there are more segments predicted as for personal use than there are segments predicted as for business use, the overall classification is predicted to be for personal use. In some examples, only segments with high classification prediction confidence level are used for determining the overall classification for the trip.

In various embodiments, aspects of the present disclosure relate to identifying, assigning, and/or receiving a set of path segments (e.g., with segment IDs) associated with a set of path (e.g., road) segments. In some examples, the set of path segments form a segment map of a region of interest (e.g., where a vehicle operator operates a vehicle). In various examples, aspects of the present disclosure relate to determining a set of traveled path segments associated with a vehicular trip traveled by a vehicle operator. For example, a vehicle operator travelling from point A to point B via a set of path segments connecting sequentially with each other from point A as the starting point to point B as the end point. In various examples, a vehicular trip may be segmented into a set of segments such that each segment matches a path segment. In some examples, each segment may be classified as for business use or for personal use, and an overall classification for the trip may be determined based at least in part upon the classifications for the segments. As an example, when there are more segments predicted as for business use than there are segments predicted as for personal use, the overall classification is predicted to be for business use. Similarly, when there are more segments predicted as for personal use than there are segments predicted as for business use, the overall classification may be predicted to be for personal use. In some examples, only segments with high classification prediction confidence level are used for determining the overall classification for the trip.

In various embodiments, aspects of the present disclosure relate to identifying a traveled segment pattern for a vehicular trip based at least in part upon the set of traveled path segments traveled during the vehicular trip. The set of path segments connected sequentially by a set of nodes. In some examples, the set of nodes may form a traveled node pattern. In various examples, aspects of the present disclosure relate to determining whether the traveled segment pattern matches a loop pattern and/or whether the traveled node pattern matches a loop pattern. In some examples, each segment and/or node may be represented as a point on a map. In certain examples, aspects of the present disclosure relate to determining whether the continuous location data (e.g., from a GPS) forms a traveled path pattern that matches a loop pattern. In some examples, the segment pattern and/or node pattern are determined for each vehicular trip or for multiple sequential (e.g., in time) vehicular trips traveled by the same vehicle operator. In various examples, a loop pattern may be a partial loop pattern and/or a conic section pattern.

In various embodiments, a loop pattern may be defined by a pattern with limited repeated segment. A repeated segment may be associated with a segment travelling multiple times during a single vehicular trip. The travel direction may reverse during the multiple times an operator traveled through the repeated segment, indicating a back-and-forth sub-pattern. Aspects of the present disclosure may limit the amount of back-and-forth sub-patterns and/or repeated segments that a travel pattern may have to still be considered a loop pattern, such as via predetermined thresholds. In some examples, a loop pattern may take, such as approximately within a predetermined degree of deviation, the shape of at least a partial portion of a conic section (e.g., a circle, an ellipse, or a segment thereof). As an example, the locations, segments, and/or nodes, when connected sequentially to form a location pattern, segment pattern, and node pattern, respectively, need not match a section of a conic section exactly, but instead may have certain degree of deviations from the conic section and still be considered a loop pattern. For example, the acceptable degree of deviations may include a predetermined deviation distance (e.g., 0.5 mile, 1 mile) from the conic section (e.g., such that the section of conic section has a width within which location, segment, and/or node may fall), and/or a predetermined number of pattern breaks that the travel pattern may deviate from the conic section.

In various embodiments, aspects of the present disclosure relate to determining whether the traveled segment patterns of a group of vehicle operators match a hub-and-spokes pattern and/or whether their location patterns match a hub-and-spokes pattern. In some examples, the group of vehicle operators may belong to the same operator group sharing one or more operator identification. For example, a shared operator identification may be a common employer, a common work region, a common work schedule (e.g., time of day and/or day of week). In various examples, aspects of the present disclosure relate to performing clustering on the travel paths traveled by the group of vehicle operators to identify a common end point or region. In certain examples, the common end point or region may be determined as a work location. In some examples, time of day traveled to a location and/or amount of time spent at a location may also be considered in determining whether the location is a work location. For example, a common end point or region may be predicted as a work location if the group of vehicle operators traveled there during working hours and/or spent at the location for less than a predetermined work duration (e.g., 10 hr, 9 hr, 8 hr). In contrast, a common end point or region may be predicted as a home location (e.g., an apartment complex) if the group of vehicle operators traveled there outside of working hours and/or spent at the location for more than a predetermined stay duration. A hub-and-spoke pattern may be a radial pattern and/or includes one or more crossover between spokes. Similar to the loop pattern above, certain degree of deviation from the hub-and-spoke pattern may be accepted. For example, the spokes representing travel paths need not be straight, nor do they need to be of the same length, nor do they need to travel from the hub uniformly outwards in every direction. That is, the spokes may be substantially distributed on certain directions to the hub (e.g., east to the hub, west to the hub, north to the hub, and/or south to the hub).

In various embodiments, aspects of the present disclosure relate to identifying a set of stops where a vehicle operator stopped for beyond a predetermined stopping time. In various examples, a subset of stops falling within a geographical boundary may be identified from the set of stops. In some examples, the geographical boundary may be associated with a work region. In certain examples, the geographical boundary may be a polygon. In some examples, the geographical boundary is predetermined. In other examples, the geographical boundary is defined by a selected set of stops of the set of stops.

In various embodiments, aspects of the present disclosure relate to identifying a set of work locations. In some examples, the set of work locations are within a geographical boundary and are traveled to during a predetermined working time window (e.g., a time period of a day and/or a day of a week). In some examples, the set of work locations are traveled by the same vehicle operator. In various examples, the vehicle operator stopped at each location for less than a predetermined stopping time (e.g., 10 minutes, 5 minutes, 3 minutes). In certain examples, historic travel data may be used to supplement the determination of the set of work locations. In some examples, identification of the set of work locations may be based at least in part upon one or more primary data (e.g., stopping time). In certain examples, identification of the set of work locations may be further based at least in part upon one or more secondary data (e.g., time of day, day of week, geographical boundary), such as to improve confidence level of the identification of the set of work locations. In some examples, secondary data includes a sequence of short stops where a vehicle operator made a number of sequential stops each with a stopping time below a predetermined stopping time threshold.

In various embodiments, aspects of the present disclosure relate to automatically identifying one or more location changes associated with a vehicle operator. For example, identifying one or more location changes may include identifying a work location change and/or a home location change. In various examples, upon identifying the one or more location changes, aspects of the present disclosure relate to determining one or more modifications to an insurance policy associated with the vehicle operator. For example, the one or more modifications may include modification to a risk factor (e.g., which may relate to the amount of traffic, the amount of risky operation scenarios such as highway mergers, high curvature turns, and/or high speed areas), modification to policy premium, modification to incentives, modification to operation challenges. As an example, upon determining that a vehicle operator moved from a shorter commute to a longer commute, the one or more modifications may include increasing a risk factor and increase in policy premium. As another example, upon determining that a vehicle operator changed work location from the outskirts of the city to a more central region (e.g., downtown) of the city, the one or more modifications may include increasing a risk factor and increase in policy premium. In some examples, in addition to identifying a change in work location, aspects of the present disclosure relate to automatically identifying a change in work region.

In various embodiments, aspects of the present disclosure relate to identifying a work schedule associated with a vehicle operator. In some examples, the work schedule includes a timetable indicating one or more vehicular trips for work traveled (e.g., on a workday, in a work week, in a quarter, and/or in a year). The timetable may include time traveled, location traveled to, and/or stopping time at each location. In some examples, abnormally large gaps between trips (e.g., during which an operator is idle) may be flagged for further investigation. In some examples, upon determining the work schedule, aspects of the present disclosure relate to determining one or more performance metric based at least in part upon the work schedule and/or additional performance data (e.g., operation behavioral scores, number of deliveries, customer ratings, efficiency, error rate). In some examples, upon determining the work schedule, aspects of the present disclosure relate to determining one or more reimbursements associated with operator-submitted reimbursement requests. In some examples, work schedule may be a delivery schedule (e.g., of a delivery driver), a rideshare schedule (e.g., of a rideshare driver).

In various embodiments, aspects of the present disclosure relate to identifying one or more distracted operation behaviors. In some examples, aspects of the present disclosure further relate to identifying one or more associated distraction features and/or distraction feature vectors. In various examples, the one or more distracted operation behaviors includes one or more mobile device interactions (e.g., taking and/or dialing a phone call, content switching, entering text, interacting with an application). In various examples, the frequency, duration, complexity, and/or method of the interaction may be factored into the determination of distraction. In some examples, the one or more distracted operation behaviors may also be determined based further upon on mobile device motion, such as during a vehicular trip. In certain examples, multiple types of distraction events may be identified where each type of distraction event may be assigned a weight. For example, content switching may be assigned with a higher weight than taking a call. In some examples, voice control interaction with the mobile device may be weighted less than hand control interaction with the mobile device. In various examples, an overall distraction score may be determined by at least multiplying each distraction event with their associated weight and adding the products of the multiplications together. In some examples, the frequency of distraction events, such as during a vehicular trip, may further be considered as a factor in the determination of a distraction score. In some examples, the overall distraction score associated with a vehicle operation may be determined based further upon the amount of vehicle trips where the vehicle operator has distraction event(s), upon the fraction of distracted operation time, and/or upon the total count of distracted events during a set of vehicular trips.

Examples of Various Embodiments of the Present Disclosure

Aspects of the present disclosure relate to a computer-implemented method for classifying a vehicular trip. In some examples, the method is implemented according to method 200 of FIG. 2, and/or configured to be implemented by system 100 of FIG. 1, device 5000 of FIG. 3, and/or system 7000 of FIG. 4. According to various embodiments of the present disclosure, a computer-implemented method for classifying a vehicular trip includes: obtaining a user classification associated with an unlabeled vehicular trip as for work or for personal use; obtaining a first set of historic device interaction data associated with a first set of historic vehicular trips during which a vehicle operator operated a vehicle for work; obtaining a second set of historic device interaction data associated with a second set of historic vehicular trips during which the vehicle operator operated the vehicle for personal use; training a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use; obtaining a set of unlabeled device interaction data associated with the unlabeled vehicular trip; classifying, using the classification model, the unlabeled vehicular trip as for work or for personal use by at least: identifying, based at least in part upon the first set of historic device interaction data, a first set of baseline device interaction features associated with the first set of historic vehicular trips; identifying, based at least in part upon the second set of historic device interaction data, a second set of baseline device interaction features associated with the second set of historic vehicular trips; identifying, based at least in part upon the set of unlabeled device interaction data, a set of representative device interaction features associated with the unlabeled vehicular trip; comparing the set of representative device interaction features against the first set of baseline device interaction features and the second set of baseline device interaction features; classifying the unlabeled vehicular trip; and validating the user classification based at least in part upon the user classification and the classification made using the classification model. In some examples, classifying the unlabeled vehicular trip includes, upon determining that the set of representative device interaction features deviates from the first set of baseline device interaction features less than from the second set of baseline device interaction features, classifying the unlabeled vehicular trip as for work. In some examples, classifying the unlabeled vehicular trip includes, upon determining that the set of representative device interaction features deviates from the first set of baseline device interaction features more than from the second set of baseline device interaction features, classifying the unlabeled vehicular trip as for personal use.

In some embodiments, validating the user classification includes accepting the user classification upon determining that the user classification matches the classification made using the classification model. In some examples, validating the user classification includes rejecting the user classification upon determining that the user classification does not match the classification made using the classification model.

In some embodiments, classifying the unlabeled vehicular trip includes generating a confidence level associated with the classification made using the classification model. In some examples, validating the user classification includes accepting the user classification upon determining that the confidence level is less than a confidence threshold.

In some embodiments, validating the user classification includes: obtaining a community classification for a set of similar vehicular trips traveled by one or more similar vehicle operators; and accepting the user classification upon determining that the user classification matches the classification made using the classification model and the community classification. In some examples, the one or more similar operators share a common employer, a common work region, and/or a common work schedule with the vehicle operator. In some examples, the set of similar vehicular trips have similar travel paths as the unlabeled vehicular trip In some embodiments, the computer-implemented method for classifying a vehicular trip further includes: obtaining a work insurance claim submitted by the vehicle operator associated with the unlabeled vehicular trip; and determining, based at least in part upon the classification, a claim decision. In various examples, determining a claim decision includes determining the claim decision as accept claim when the classification is for work. In various examples, determining a claim decision includes determining the claim decision as reject claim when the classification is for personal use.

In some embodiments, the computer-implemented method for classifying a vehicular trip further includes: obtaining a personal insurance claim submitted by the vehicle operator associated with the unlabeled vehicular trip; and determining, based at least in part upon the classification, a claim decision. In various examples, determining a claim decision includes determining the claim decision as accept claim when the classification is for personal use. In various examples, determining a claim decision includes determining the claim decision as reject claim when the classification is for work.

In some embodiments, the computer-implemented method for classifying a vehicular trip further includes, upon classifying the unlabeled vehicular trip as for work, determining a set of policy modifications associated with a work insurance policy of the vehicle operator based at least in part upon the set of representative device interaction features. In some examples, the computer-implemented method further includes, upon classifying the unlabeled vehicular trip as for personal use, determining a set of policy modifications associated with a personal insurance policy of the vehicle operator based at least in part upon the set of representative device interaction features.

In some embodiments, the one or more policy modifications includes modify policy premium, modify a risk score, modify an operator behavioral score, modify a policy incentive, issue an reimbursement, and/or modify a device interaction challenge.

In some embodiments, the computer-implemented method for classifying a vehicular trip further includes: obtaining a first set of historic path conditions associated with the first set of historic vehicular trips; obtaining a second set of historic path conditions associated with the second set of historic vehicular trips; and obtaining a set of unlabeled path conditions associated with the unlabeled vehicular trip. In some examples, identifying the first set of baseline device interaction features includes calibrating the first set of baseline device interaction features based at least in part upon the first set of historic path conditions. In some examples, identifying the second set of baseline device interaction features includes calibrating the second set of baseline device interaction features based at least in part upon the second set of historic path conditions. In some examples, identifying the set of representative device interaction features includes calibrating the set of representative device interaction features based at least in part upon the set of unlabeled path conditions.

In some embodiments, each of the first set of historic path conditions, the second set of historic path conditions, and the set of unlabeled path conditions includes path curvature, path speed limit, average speed by travelers on path, traffic condition, weather condition, and/or time of day.

In some embodiments, classifying the unlabeled vehicular trip further includes: identifying, based at least in part upon the first set of baseline device interaction features, a first set of baseline feature vectors associated with the first set of historic vehicular trips; identifying, based at least in part upon the second set of baseline device interaction features, a second set of baseline feature vectors associated with the second set of historic vehicular trips; identifying, based at least in part upon the set of representative device interaction features, a set of representative feature vectors associated with the unlabeled vehicular trip; mapping the first set of baseline feature vectors, the second set of baseline feature vectors, and the set of representative feature vectors on a feature space; determining a first set of vector deviations between the set of representative feature vectors and the first set of baseline feature vectors in the feature space; determining a second set of vector deviations between the set of representative feature vectors and the second set of baseline feature vectors in the feature space; and classifying the unlabeled vehicular trip. In some examples, classifying the unlabeled vehicular trip includes, upon determining that the first set of vector deviations is less than the second set of vector deviations, classifying the unlabeled vehicular trip as for work. In some examples, classifying the unlabeled vehicular trip includes, upon determining that the first set of vector deviations is more than the second set of vector deviations, classifying the unlabeled vehicular trip as for personal use.

In some embodiments, the computer-implemented method for classifying a vehicular trip further includes determining a first similarity metric based at least in part upon the first set of vector deviations; determining a second similarity metric based at least in part upon the second set of vector deviations; and classifying the unlabeled vehicular trip. In some examples, classifying the unlabeled vehicular trip includes, upon determining that the first similarity metric is more than the second similarity metric, classifying the unlabeled vehicular trip as for work. In some examples, classifying the unlabeled vehicular trip includes, upon determining that the first similarity metric is less than the second similarity metric, classifying the unlabeled vehicular trip as for personal use.

In some embodiments, determining the first similarity metric and the second similarity metric includes: obtaining a set of weights associated with the first set of baseline device interaction features, the second set of baseline device interaction features, and the set of representative device interaction features such that each baseline device interaction feature and an associated representative device interaction feature is assigned with a weight; determining, for each device interaction feature, a multiplication product by multiplying each vector deviation by an associated weight; and determining the first similarity metric and second similarity metric as weighted similarity metrics based at least in part upon the sum of the multiplication products for each of the first set of vector deviations and second set of vector deviations.

In various embodiments, some device interaction features may be assigned weights higher than others. For example, a first weight may be assigned to the device interaction feature of content switching; a second weight may be assigned to the device interaction feature of entering text; and a third weight may be assigned to the device interaction feature of taking a phone call. The first weight and/or the second weight may be greater than the third weight.

In some embodiments, determining the first similarity metric and the second similarity metric includes: transforming each vector deviation of the first set of vector deviations and second set of vector deviations into an mean squared error; and summing up the set of mean squared errors for each of the first set of vector deviations and second set of vector deviations.

In some embodiments, identifying the first set of baseline device interaction features includes identifying a first sequence of baseline device interaction features based at least in part upon the first set of historic device interaction data. In some examples, identifying the second set of baseline device interaction features includes identifying a second sequence of baseline device interaction features based at least in part upon the second set of historic device interaction data. In some examples, identifying the set of representative device interaction features includes identifying a sequence of representative device interaction features based at least in part upon the set of unlabeled device interaction data. In some examples, comparing the set of representative device interaction features against the first set of baseline device interaction features and the second set of baseline device interaction features includes comparing the sequence of representative device interaction features against the first sequence of baseline device interaction features and the second sequence of baseline device interaction features. In some examples, classifying the unlabeled vehicular trip includes, upon determining that the sequence of representative device interaction features deviates from the first sequence of baseline device interaction features less than from the second sequence of baseline device interaction features, classifying the unlabeled vehicular trip as for work. In some examples, classifying the unlabeled vehicular trip includes, upon determining that the sequence of representative device interaction features deviates from the first sequence of baseline device interaction features more than from the second sequence of baseline device interaction features, classifying the unlabeled vehicular trip as for personal use.

In some embodiments, classifying the unlabeled vehicular trip further includes: identifying, based at least in part upon the first sequence of baseline device interaction features, a first baseline vector pattern; identifying, based at least in part upon the second sequence of baseline device interaction features, a second baseline vector pattern; identifying, based at least in part upon the sequence of representative device interaction features, a representative vector pattern; mapping the first baseline vector pattern, the second baseline vector pattern, and the representative vector pattern on a feature space; determining a first vector pattern deviation between the first baseline vector pattern and the representative vector pattern in the feature space; determining a second vector pattern deviation between the second baseline vector pattern and the representative vector pattern in the feature space; and classifying the unlabeled vehicular trip. In some examples, classifying the unlabeled vehicular trip includes, upon determining that the first vector pattern deviation is less than the second vector pattern deviation, classifying the unlabeled vehicular trip as for work. In some examples, classifying the unlabeled vehicular trip includes, upon determining that the first vector pattern deviation is more than the second vector pattern deviation, classifying the unlabeled vehicular trip as for personal use.

In some embodiments, each of the first set of baseline device interaction features, the second set of baseline device interaction features, and the set of representative device interaction features includes taking a phone call, making a phone call, content switching, content interacting, entering text, interacting with a navigation application, interacting with a communication application, interacting with a vehicle monitoring application, interacting with a delivery application, interacting with a rideshare application, interacting with a finance application, interacting with an internet browsing application, interacting with a shopping application, interacting with an entertainment application, interaction frequency information, interaction duration information, interaction complexity information, and/or interaction method information.

Aspects of the present disclosure relate to a computing system for classifying a vehicular trip. In some examples, the computing system is configured according to system 100 of FIG. 1, device 5000 of FIG. 3, and/or system 7000 of FIG. 4 and/or configured to perform one or more operations of method 200 of FIG. 2. According to various embodiments of the present disclosure, a computing system includes: one or more processors; and a memory storing instructions that, upon execution by the one or more processors, cause the computing system to perform one or more processes including: obtaining a user classification associated with an unlabeled vehicular trip as for work or for personal use; obtaining a first set of historic device interaction data associated with a first set of historic vehicular trips during which a vehicle operator operated a vehicle for work; obtaining a second set of historic device interaction data associated with a second set of historic vehicular trips during which the vehicle operator operated the vehicle for personal use; training a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use; obtaining a set of unlabeled device interaction data associated with the unlabeled vehicular trip; classifying, using the classification model, the unlabeled vehicular trip as for work or for personal use by at least: identifying, based at least in part upon the first set of historic device interaction data, a first set of baseline device interaction features associated with the first set of historic vehicular trips; identifying, based at least in part upon the second set of historic device interaction data, a second set of baseline device interaction features associated with the second set of historic vehicular trips; identifying, based at least in part upon the set of unlabeled device interaction data, a set of representative device interaction features associated with the unlabeled vehicular trip; comparing the set of representative device interaction features against the first set of baseline device interaction features and the second set of baseline device interaction features; classifying the unlabeled vehicular trip; and validating the user classification based at least in part upon the user classification and the classification made using the classification model. In some examples, classifying the unlabeled vehicular trip includes, upon determining that the set of representative device interaction features deviates from the first set of baseline device interaction features less than from the second set of baseline device interaction features, classifying the unlabeled vehicular trip as for work. In some examples, classifying the unlabeled vehicular trip includes, upon determining that the set of representative device interaction features deviates from the first set of baseline device interaction features more than from the second set of baseline device interaction features, classifying the unlabeled vehicular trip as for personal use.

Aspects of the present disclosure relate non-transitory computer-readable medium storing instructions for classifying a vehicle trip. In some examples, the non-transitory computer-readable medium, upon execution by one or more processors associated with a computing system (e.g., system 100 of FIG. 1, device 5000 of FIG. 3, and/or system 7000 of FIG. 4), causes the corresponding system to perform one or more operations of method 200 of FIG. 2. According to various embodiments of the present disclosure, a non-transitory computer-readable medium storing instructions for classifying a vehicular trip, the instructions upon execution by one or more processors of a computing system, cause the computing system to perform one or more processes including: obtaining a user classification associated with an unlabeled vehicular trip as for work or for personal use; obtaining a first set of historic device interaction data associated with a first set of historic vehicular trips during which a vehicle operator operated a vehicle for work; obtaining a second set of historic device interaction data associated with a second set of historic vehicular trips during which the vehicle operator operated the vehicle for personal use; training a classification model based at least in part upon the first set of historic device interaction data and the second set of historic device interaction data such that: upon receiving an input of device interaction data selected from the first set of historic device interaction data, the classification model outputs a classification for an associated vehicular trip as for work; and upon receiving an input of device interaction data selected from the second set of historic device interaction data, the classification model outputs a classification for an associated vehicular trip as for personal use; obtaining a set of unlabeled device interaction data associated with the unlabeled vehicular trip; classifying, using the classification model, the unlabeled vehicular trip as for work or for personal use by at least: identifying, based at least in part upon the first set of historic device interaction data, a first set of baseline device interaction features associated with the first set of historic vehicular trips; identifying, based at least in part upon the second set of historic device interaction data, a second set of baseline device interaction features associated with the second set of historic vehicular trips; identifying, based at least in part upon the set of unlabeled device interaction data, a set of representative device interaction features associated with the unlabeled vehicular trip; comparing the set of representative device interaction features against the first set of baseline device interaction features and the second set of baseline device interaction features; classifying the unlabeled vehicular trip; and validating the user classification based at least in part upon the user classification and the classification made using the classification model. In some examples, classifying the unlabeled vehicular trip includes, upon determining that the set of representative device interaction features deviates from the first set of baseline device interaction features less than from the second set of baseline device interaction features, classifying the unlabeled vehicular trip as for work. In some examples, classifying the unlabeled vehicular trip includes, upon determining that the set of representative device interaction features deviates from the first set of baseline device interaction features more than from the second set of baseline device interaction features, classifying the unlabeled vehicular trip as for personal use.

Examples of Some Embodiments of the Present Disclosure

In certain embodiments, aspects of the present disclosure relate to systems and methods for classifying a vehicular trip as for personal use or for work.

In certain embodiments, aspects of the present disclosure relate to systems and methods for classifying a vehicular trip as for personal use or for work based on different operation behaviors. In various examples, a method for classifying a vehicular trip includes: receiving first sensor data collected during operation of a vehicle by an operator during a plurality of work trips; receiving second sensor data collected during operation of the vehicle by the operator during a plurality of personal trips; training a classification model based at least in part upon the first sensor data and the second sensor data; receiving unlabeled sensor data collected during an unlabeled vehicular trip operated by the operator; and classifying, using the classification model, the unlabeled vehicular trip to be for work or for personal use. In some examples, training the classification model includes: identifying a first set of operation behaviors associated with how the operator historically operates during the plurality of work trips; and identifying a second set of operation behaviors associated with how the operator historically operates during the plurality of personal trips. In some examples, each of the first set of operation behaviors and the second set of operation behaviors includes route choice, acceleration characteristics, maximum speed, average speed, braking characteristics, turning radius, and/or following distance. In some examples, classifying the unlabeled vehicular trip to be traveled for work or for personal use includes: determining a third set of operation behaviors associated with how the operator operates during the unlabeled vehicular trip; comparing the third set of operation behaviors with the first set of operation behaviors and with the second set of operation behaviors; upon determining that the third set of operation behaviors is more similar to (e.g., substantially similar to) the first set of operation behaviors, classifying the unlabeled vehicular trip to be for work; and upon determining that the third set of operation behaviors is more similar to (e.g., substantially similar to) the second set of operation behaviors, classifying the unlabeled vehicular trip to be traveled for personal use.

In certain embodiments, aspects of the present disclosure relate to systems and methods for classifying a vehicular trip as for personal use or for work based on different operation behaviors and vehicles. In various examples, a method for classifying a vehicular trip includes: receiving first sensor data collected during operation of a vehicle when operated by an operator, the vehicle being a work vehicle; receiving second sensor data collected during operation of a second vehicle when operated by the operator, the second vehicle being a personal vehicle; training a classification model based at least in part upon the first sensor data and the second sensor data; receiving unlabeled sensor data collected during an unlabeled vehicular trip operated by the operator with the work vehicle or the personal vehicle; and classifying, using the classification model, the unlabeled vehicular trip to be traveled with one or the work vehicle and the personal vehicle. In some examples, training the classification model includes: identifying a first set of operation behaviors associated with how the operator historically operates the vehicle; and identifying a second set of operation behaviors associated with how the operator historically operates the second vehicle. In some examples, each of the first set of operation behaviors and the second set of operation behaviors includes route choice, acceleration characteristics, maximum speed, average speed, braking characteristics, turning radius, and/or following distance. In some examples, classifying the unlabeled vehicular trip to be traveled with one or the work vehicle and the personal vehicle includes: determining a third set of operation behaviors associated with how the operator operates during the unlabeled vehicular trip; comparing the third set of operation behaviors with the first set of operation behaviors and with the second set of operation behaviors; upon determining that the third set of operation behaviors is more similar to (e.g., substantially similar to) the first set of operation behaviors, classifying the unlabeled vehicular trip to be traveled with the work vehicle; and upon determining that the third set of operation behaviors is more similar to (e.g., substantially similar to) the second set of operation behaviors, classifying the unlabeled vehicular trip to be traveled with the personal vehicle.

In certain embodiments, aspects of the present disclosure relate to systems and methods for classifying a vehicular trip as for personal use or for work based on deviation in vehicle-specific operation behaviors. In various examples, a method for classifying a vehicular trip includes: receiving first sensor data collected during operation of a vehicle when operated by an operator, the vehicle being a work vehicle; training a classification model based at least in part upon the first sensor data; receiving unlabeled sensor data collected during an unlabeled vehicular trip operated by the operator with the work vehicle or a personal vehicle; and classifying, using the classification model, the unlabeled vehicular trip to be traveled with one or the work vehicle and the personal vehicle. In some examples, training the classification model includes identifying a first set of operation behaviors associated with how the operator historically operates the vehicle. In some examples, the first set of operation behaviors includes route choice, acceleration characteristics, maximum speed, average speed, braking characteristics, turning radius, and/or following distance. In some examples, classifying the unlabeled vehicular trip to be traveled with one or the work vehicle and the personal vehicle includes: determining a second set of operation behaviors associated with how the operator operates during the unlabeled vehicular trip; comparing the second set of operation behaviors with the first set of operation behaviors; upon determining that the second set of operation behaviors is similar to (e.g., substantially similar to) the first set of operation behaviors, classifying the unlabeled vehicular trip to be traveled with the work vehicle; and upon determining that the second set of operation behaviors deviates from the first set of operation behaviors by more than one or more predetermined change thresholds, classifying the unlabeled vehicular trip to be traveled with the personal vehicle.

In certain embodiments, aspects of the present disclosure relate to systems and methods for classifying a vehicular trip as for personal use or for work with user input. In various examples, a method for classifying a vehicular trip includes: receiving unlabeled sensor data collected during an unlabeled vehicular trip operated by the operator with a work vehicle or a personal vehicle; identifying a set of predicted operation behaviors based at least in part upon the sensor data; comparing the set of predicted operation behaviors to: a first set of predetermined operation behaviors associated with how the operator historically operates a work vehicle; and a second set of predetermined operation behaviors associated with how the operator historically operates a personal vehicle; classifying the unlabeled vehicular trip to be traveled with one or the work vehicle and the personal vehicle by at least: upon determining that the set of predicted operation behaviors is more similar to (e.g., substantially similar to) the first set of predetermined operation behaviors, classifying the unlabeled vehicular trip to be traveled with the work vehicle; and upon determining that the set of predicted operation behaviors is more similar to (e.g., substantially similar to) the second set of predetermined operation behaviors, classifying the unlabeled vehicular trip to be traveled with the personal vehicle; determining a classification confidence level associated with the classification of the unlabeled vehicular trip; and upon determining the classification confidence level is below a predetermined confidence threshold, request user verification of the classification of the unlabeled vehicular trip.

In certain embodiments, aspects of the present disclosure relate to systems and methods for validating user classification of a vehicular trip as for personal use or for work based on user data. In various examples, a method for validating a classification of a vehicular trip includes: receiving a user-provided classification of a vehicular trip, the user-provided classification indicating whether the vehicular trip was traveled with a work vehicle or a personal vehicle; receiving sensor data collected during the vehicular trip; identifying a set of predicted operation behaviors based at least in part upon the sensor data; comparing the set of predicted operation behaviors to: a first set of predetermined operation behaviors associated with how the operator historically operates a work vehicle; and a second set of predetermined operation behaviors associated with how the operator historically operates a personal vehicle; generating a predicted classification indicating whether the vehicular trip was traveled with the work vehicle or the personal vehicle by at least: upon determining that the set of predicted operation behaviors is more similar to (e.g., substantially similar to) the first set of predetermined operation behaviors, generating the predicted classification to be for work; and upon determining that the set of predicted operation behaviors is more similar to (e.g., substantially similar to) the second set of predetermined operation behaviors, generating the predicted classification to be for personal use; and validating the user-provided classification upon determining the user-provided classification to match the predicted classification.

In certain embodiments, aspects of the present disclosure relate to systems and methods for validating user classification of a vehicular trip as for personal use or for work based on community data. In various examples, a method for validating a classification of a vehicular trip includes: receiving an employee-provided classification of a vehicular trip, the employee-provided classification indicating whether the vehicular trip was traveled with a work vehicle; receiving sensor data collected during the vehicular trip; identifying a set of predicted operation behaviors based at least in part upon the sensor data; comparing the set of predicted operation behaviors to a set of predetermined operation behaviors associated with how a plurality of employees operates a work vehicle; generating a predicted classification indicating whether the vehicular trip was traveled with the work vehicle by at least: upon determining that the set of predicted operation behaviors deviates from the set of predetermined operation behaviors smaller than or equal to one or more predetermined deviation thresholds, generating the predicted classification to be for work; and upon determining that the set of predicted operation behaviors deviates from the set of predetermined operation behaviors more than the one or more predetermined deviation thresholds, generating the predicted classification to be for personal use; and validating the user-provided classification upon determining the user-provided classification to match the predicted classification.

In certain embodiments, aspects of the present disclosure relate to systems and methods for validating user-provided trip data. In various examples, a method for validating user-provided trip data includes: receiving a user-provided trip data associated with an unlabeled vehicular trip, the user-provided trip data including the mileage traveled and a user-classification that the unlabeled vehicular trip was for work; receiving sensor data collected during the unlabeled vehicular trips; identifying, based at least in part upon the sensor data, a set of predicted operation behaviors associated with how the user operated during the unlabeled vehicular trip; comparing the set of predicted operation behaviors to: a first set of predetermined operation behaviors associated with how the operator historically operates during a work vehicular trip; and a second set of predetermined operation behaviors associated with how the operator historically operates during a personal vehicular trip; generating a predicted classification for the unlabeled vehicular trip by at least: upon determining that the set of predicted operation behaviors is more similar to (e.g., substantially similar to) the first set of predetermined operation behaviors, generating the predicted classification to be for work; and upon determining that the set of predicted operation behaviors is more similar to (e.g., substantially similar to) the second set of predetermined operation behaviors, generating the predicted classification to be for personal use; and upon determining the user-provided classification matches the predicted classification and the mileage traveled matches the sensor data, generating a work reimbursement based at least in part upon the mileage traveled.

In certain embodiments, aspects of the present disclosure relate to systems and methods for classifying a location associated with a vehicular trip based on location clustering. In various examples, a method for classifying a location associated with a vehicular trip includes: receiving, from a plurality of operators, trip data associated a plurality of vehicular trips traveled by the plurality of operators, the trip data including location data and timing data, the location data including, for each trip of the plurality of vehicular trips, a start location and an end location; and the timing data including, for each trip of the plurality of vehicular trips, one of time of day, day of week, travel duration, and duration of stay at the end location; identifying, based at least in part upon the trip data, a group of end locations of the plurality of vehicular trips such that: each end location of the group of end locations is located within a region of a predetermined size; and a corresponding operator at least one of: arrived at each end location of the group of end locations within a predetermined time period; and stayed at each end location of the group of end locations for longer than a predetermined time duration; and determining that the group of end locations correspond to a common work location.

In certain embodiments, aspects of the present disclosure relate to systems and methods for classifying a location associated with a vehicular trip based on a loop connectedness. In various examples, a method for classifying a location associated with a vehicular trip includes: receiving location data associated with a plurality of vehicular trips traveled by an operator (e.g., a delivery driver or a rideshare driver) within a time period of interest, the location data including an end location for each vehicular trip of the plurality of vehicular trips; identifying, based at least in part upon the location data, a location pattern that connects each location of the plurality of vehicular trips; determining whether the location pattern matches a loop pattern; and upon determining that the location pattern matches with a loop pattern, classifying the end locations of the plurality of vehicular trips to be one of delivery destinations (e.g., for a delivery driver) and drop-off locations (e.g., for a rideshare driver).

In certain embodiments, aspects of the present disclosure relate to systems and methods for classifying a location associated with a vehicular trip based on a hub-and-spokes connectedness. In various examples, a method for classifying a location associated with a vehicular trip includes: receiving location data associated with a plurality of vehicular trips traveled by a plurality of operators within a time period of interest, the location data including a start location and an end location for each vehicular trip of the plurality of vehicular trips; identifying, based at least in part upon the location data, a location pattern that connects, for each vehicular trip of the plurality of vehicular trips, the start location to the end location; determining whether the location pattern matches a hub-and-spokes pattern; and upon determining that the location pattern matches with a hub-and-spokes pattern, classifying the start locations and end locations located at the hub of the hub-and-spokes pattern as work locations.

In certain embodiments, aspects of the present disclosure relate to systems and methods for classifying multiple locations as for work. In various examples, a method for classifying a location associated with a vehicular trip includes: receiving trip data associated a plurality of vehicular trips traveled by an operator, the trip data including location data and timing data, the location data including a plurality of locations where the operator traveled to; and the timing data including, for each trip of the plurality of vehicular trips, a duration of stay at each location of the plurality of locations; identifying, from the plurality of locations based on the durations of stay, a group of locations where the operator: spent more than a threshold duration of time within a time period of interest, and traveled to during a predetermined working period; and classifying the group of locations to be for work. In some examples, the group of locations are located within a location cluster of a predetermined size. In some examples, the operator spent more than a threshold portion of the predetermined working period at the group of locations.

In certain embodiments, aspects of the present disclosure relate to systems and methods for detecting job change. In various examples, a method for detecting a job change includes: receiving historic trip data associated with how a user traveled during a plurality of historic trips, the historic trip data including historic location data and historic timing data; determining, based at least in part upon the historic trip data, a historic work location where the user spent more than a threshold amount of time during a predetermined working schedule; receiving recent trip data associated with how the user traveled during a plurality of recent trips, the recent trip data including recent location data and recent timing data; determining, based at least in part upon the recent trip data, a recent work location where the user spent more than the threshold amount of time during the predetermined working schedule; comparing the recent work location to the historic work location; and upon determining that the recent work location deviates from the historic work location by more than a predetermined deviation threshold, generating a notification indicating a job change.

In certain embodiments, aspects of the present disclosure relate to systems and methods for detecting a work schedule. In various examples, a method for detecting a work schedule includes: receiving trip data associated with how a user traveled during a plurality of trips, the trip data including location data and timing data; determining, from a plurality of locations traveled to by the user during the plurality of trips based at least in part upon the trip data, one or more work locations to be for work; determining one or more work periods during which the user stayed at the one or more work locations; generating a predicted work schedule to include the one or more work periods as working periods; determining a confidence level associated with the predicted work schedule; upon determining that the confidence level is below a predetermined confidence threshold, requesting user input, the user input including one or more modifications to the predicted work schedule; comparing the user input to the trip data; and upon determining that the user input is consistent with the trip data, modifying the predicted work schedule according to the one or more modifications.

In certain embodiments, aspects of the present disclosure relate to systems and methods for classifying a vehicular trip using mobile device interaction data. In various examples, a method for classifying a vehicular trip includes: receiving first interaction data associated with a first set of interactions with a mobile device by an operator during a plurality of work vehicular trips; receiving second interaction data associated with a second set of interactions with the mobile device by the operator during a plurality of personal vehicular trips training a classification model based at least in part upon the first interaction data and the second interaction data; receiving unlabeled interaction data collected during an unlabeled vehicular trip operated by the operator; and classifying, using the classification model, the unlabeled vehicular trip to be for work or for personal use by at least: identifying, based at least in part upon the unlabeled interaction data, a third set of interactions; comparing the third set of interactions with the first set of interactions and with the second set of interactions; upon determining that the third set of interactions is more similar to (e.g., substantially similar to) the first set of interactions, classifying the unlabeled vehicular trip to be for work; and upon determining that the third set of interactions is more similar to (e.g., substantially similar to) the second set of interactions, classifying the unlabeled vehicular trip to be for personal use.

In certain embodiments, aspects of the present disclosure relate to systems and methods for proportionally classifying a set of vehicular trips. In various examples, a method for proportionally classifying vehicular trips includes: receiving first sensor data collected during operation of a vehicle by an operator during a plurality of work trips; receiving second sensor data collected during operation of the vehicle by the operator during a plurality of personal trips; training a classification model based at least in part upon the first sensor data and the second sensor data; receiving unlabeled sensor data collected during a plurality of unlabeled vehicular trip operated by the operator during a time period of interest; and determining, using the classification model, a predicted proportion of the plurality of unlabeled vehicular trips to be for work. In some examples, training the classification model includes: identifying a first set of operation behaviors associated with how the operator historically operates during the plurality of work trips; and identifying a second set of operation behaviors associated with how the operator historically operates during the plurality of personal trips. In some examples, determining the predicted proportion includes: determining, for each unlabeled vehicular trip of the plurality of unlabeled vehicular trip, a precited classification and an associated confidence level; and determining the predicted proportion based at least in part upon the precited classifications and confidence levels. In some examples, determining the precited classification includes: determining a third set of operation behaviors associated with how the operator operates during each unlabeled vehicular trip; comparing the third set of operation behaviors with the first set of operation behaviors and with the second set of operation behaviors; upon determining that the third set of operation behaviors is more similar to (e.g., substantially similar to) the first set of operation behaviors, determining the precited classification to be for work; and upon determining that the third set of operation behaviors is more similar to (e.g., substantially similar to) the second set of operation behaviors, determining the precited classification to be traveled for personal use.

In certain embodiments, one or more of systems and methods for classifying a vehicular trip as for personal use or for work based on different operation behaviors, systems and methods for classifying a vehicular trip as for personal use or for work based on different operation behaviors and vehicles, systems and methods for classifying a vehicular trip as for personal use or for work based on deviation in vehicle-specific operation behaviors, systems and methods for classifying a vehicular trip as for personal use or for work with user input, systems and methods for validating user classification of a vehicular trip as for personal use or for work based on user data, systems and methods for validating user classification of a vehicular trip as for personal use or for work based on community data, systems and methods for validating user-provided trip data, systems and methods for classifying a location associated with a vehicular trip based on location clustering, systems and methods for classifying a location associated with a vehicular trip based on a loop connectedness, systems and methods for classifying a location associated with a vehicular trip based on a hub-and-spokes connectedness, systems and methods for classifying multiple locations as for work, systems and methods for detecting job change, systems and methods for detecting a work schedule, systems and methods for classifying a vehicular trip using mobile device interaction data, and systems and methods for proportionally classifying a set of vehicular trips is modified according to and/or combined with one or more of systems and methods for classifying a vehicular trip as for personal use or for work based on different operation behaviors, systems and methods for classifying a vehicular trip as for personal use or for work based on different operation behaviors and vehicles, systems and methods for classifying a vehicular trip as for personal use or for work based on deviation in vehicle-specific operation behaviors, systems and methods for classifying a vehicular trip as for personal use or for work with user input, systems and methods for validating user classification of a vehicular trip as for personal use or for work based on user data, systems and methods for validating user classification of a vehicular trip as for personal use or for work based on community data, systems and methods for validating user-provided trip data, systems and methods for classifying a location associated with a vehicular trip based on location clustering, systems and methods for classifying a location associated with a vehicular trip based on a loop connectedness, systems and methods for classifying a location associated with a vehicular trip based on a hub-and-spokes connectedness, systems and methods for classifying multiple locations as for work, systems and methods for detecting job change, systems and methods for detecting a work schedule, systems and methods for classifying a vehicular trip using mobile device interaction data, and systems and methods for proportionally classifying a set of vehicular trips.

In various embodiments, a method of and/or system for classifying a vehicular trip includes classifying a vehicle type of a vehicle associated with the vehicular trip. In some embodiments, classifying a vehicular trip and/or classifying a vehicle type includes identifying change in sensor data, change in telematics data, and/or change in driver behaviors. In various examples, machine learning, such as a neural network, may be employed to classify vehicle type and/or vehicular trip. For example, a machine learning model is first trained to identify vehicle type and/or vehicular trip type using supervised, semi-supervised, or unsupervised training. In some examples, the method of and/or system for classifying a vehicular trip and/or a vehicle type includes determining, such as using a trained model, one or more differences between how a vehicle operator operates two different vehicles. In some examples, the method of and/or system for classifying a vehicular trip and/or a vehicle type includes determining, such as using a trained model, one or more differences between how a vehicle performs different than another vehicle under the same or similar driving behaviors. In certain examples, a change in driver behavior is one of a change in route choice, acceleration frequency, maximum speed, average speed, braking frequency, and sudden braking frequency.

In various embodiments, the method of and/or system for classifying a vehicular trip and/or a vehicle type includes receiving personal data (e.g., telematics data associated with one or more known operators) and classifying based at least in part upon telematics data and personal data. In some examples, personal data may include vehicle identifications and/or quantity of vehicles associated with an operator. For example, personal data of operator A may indicate that operator A has a vehicle A and a vehicle B, where the vehicle A is used for personal vehicular trips and vehicle B is used for non-personal vehicular trips (e.g., for business).

In various embodiments, the method of and/or system for classifying a vehicular trip and/or a vehicle type includes training a machine learning model using labeled data such that the trained model may predict one or more attributes of a vehicle based on sensor data collected during a vehicular trip driven with the vehicle. The machine learning model may be a neural network having a multi-target prediction architecture and/or one trained to transform raw sensor data and use as input to predict a classification. In some examples, the method of and/or system for classifying a vehicular trip and/or a vehicle type includes a one-vs-all classifying method including training and using a model to differentiate data of a particular target vehicle and data of all other vehicles. In certain examples, the method of and/or system for classifying a vehicular trip and/or a vehicle type provides an application-based solution to the classification problem.

In various embodiments, the methods and/or systems of the present disclosure includes triggering driver-reporting of vehicle types based at least in part upon vehicle uncertainty. In some embodiments, the methods and/or systems of the present disclosure includes determining a confidence level or interval associated with a vehicular classification prediction. In certain embodiments, if the confidence level is below a predetermined threshold, for example when the prediction result is an unknown vehicle and/or when a measure of uncertainty is high, the methods and/or systems of the present disclosure includes requesting operator input to aid classification. The operator input may be a driver-based report including vehicular information associated with the vehicle of interest. In some examples, the confidence level or interval may be a range or a value. In certain examples, determining confidence includes using a twin model with a first model configured to generate a prediction and the second model configured to generate an error associated with the prediction generated by the first model. In certain examples, determining confidence includes using a data sampling method. In certain examples, determining confidence includes using the Bayesian method. In certain examples, determining confidence includes generating predictions and an associated distribution of confidence associated with the predictions.

In various embodiments, the methods and/or systems of the present disclosure includes validating driver-reported vehicle types. In some embodiments, the methods and/or systems of the present disclosure includes receiving driver (e.g., operator) provided vehicular data, such as vehicular data associated with a target vehicle (e.g., a personal vehicle or a non-personal vehicle); and validating if the provided vehicular data is consistent with the data (e.g., in a database) historically associated with the target vehicle. In various examples, validating if the provided vehicular data is consistent includes comparing the driver-provided vehicular data with data previously collected associated with the target vehicle; and/or comparing the driver-provided vehicular data with data associated with other vehicles (e.g., associated with other operators) of the vehicle type of the target vehicle. For example, comparing includes comparing whether the driver-provided data indicates that the driver drove a delivery vehicle similarly with other drivers who drive a similar delivery vehicle. Alternatively, comparing includes comparing whether the driver-provided data indicates that the driver drove a hybrid vehicle similarly with other drivers who drive a similar hybrid vehicle.

In some examples, the methods and/or systems of the present disclosure includes validating driver-reported vehicle types using a trained model configured to differentiate vehicle data associated with one specific vehicle type from vehicle data associated all other vehicle types, such as a one-vs-all classification. In some examples, the methods and/or systems of the present disclosure includes validating driver-reported vehicle types using a trained model configured to differentiate vehicle data associated with a vehicle type from vehicle data associated with a second vehicle type, such as a one-vs-one classification. In various examples, the methods and/or systems of the present disclosure includes determining a consistency of analysis of driver-provided data (e.g., vehicular and/or trip data) with analysis of previously received (e.g., recorded) data. In some examples, the methods and/or systems of the present disclosure includes determining a confidence level on the consistency prediction and, in certain examples, eliminating outlier data to help improve prediction.

In various embodiments, the methods and/or systems of the present disclosure includes identifying location type, such as identifying whether a location is office, home, or a stopover (e.g., a delivery destination or a drop-off location). In some examples, the methods and/or systems of the present disclosure includes location clustering, such as based at least in part upon timing information including the day of week of the stay at the location, the time of day of the stay at the location, and/or the length of stay at the location. In some examples, location clustering is based at least in part upon location data associated with surrounding area or district, such as whether the district is a business zone or a residential zone. In certain examples, location clustering is based at least in part upon travel data, such as data (e.g., distribution data) associated with other operators, data including whether others visit such location, frequency of their visits, and/or timing of their visits. In various examples, location clustering includes grouping a plurality of end-points traveled to by multiple vehicle operators into one or more locations or location areas. In certain examples, location clustering includes grouping trip data (e.g., sensor data, telematics data, timing data), such as including end-point data. For example, location clustering may identify, from trip data including end-point data and timing data, that a common location is a work location when a plurality of drivers traveled from a plurality of locations to the common location with arrival times between a predetermined time period (e.g., 8 am to 9 am) and/or remained at the common location for more than predetermined time duration (e.g., 6 hour to 10 hour). In some examples, the methods and/or systems of the present disclosure includes determining a vehicle type based at least in part upon the location type.

In various embodiments, the methods and/or systems of the present disclosure includes identifying location type based at least in part upon determining connectedness of a plurality of trips, such as a plurality of trips driven by the same operator and/or driven with the same vehicle. In certain examples, determining connectedness of a plurality of trips includes determining whether the paths of the plurality of trips indicate a loop pattern or a hub-and-spokes pattern. In various examples, upon determining that the paths of the plurality of trips indicate a loop pattern, the methods and/or systems of the present disclosure includes determining that at least a substantial portion of a plurality of end-points associated with the plurality of trips corresponds to delivery destinations (e.g., of a delivery vehicle) or drop-off locations (e.g., of a rideshare vehicle). In some examples, the methods and/or systems of the present disclosure includes determining connectedness of a plurality of trips, such as a plurality of trips driven by multiple operator and/or driven with multiple vehicles.

In various examples, upon determining that the paths of the plurality of trips indicate a hub-and-spokes pattern, such as one indicating a plurality of drivers traveling from a plurality of locations to a common location and/or traveling from a common location to a plurality of locations, the methods and/or systems of the present disclosure includes determining at least a substantial portion of a plurality of end-points associated with the plurality of trips corresponds to residential locations and that the common location corresponds to a work location.

In some examples, identifying location type includes determining route uniqueness, such as by at least classifying, such as using a trained model, whether a route is a unique route or a recurring route. In certain examples, determining route uniqueness includes comparing the route of a target trip to routes of a plurality of prior trips driven by the driver. For example, determining route uniqueness may include determining that a target route is recurring when it substantially overlaps with a plurality of prior trips where the driver traveled from a residential location to a work location, and thereby determining that the destination of the target route is the work location, and/or the start of the target route is the residential location.

In various embodiments, the methods and/or systems of the present disclosure includes detecting if a user has a fixed office location. In some examples, identifying location type includes identifying one or more office locations associated with a user, such as multiple office locations associated with the user, such as multiple store locations (e.g., of a delivery service) associated with a delivery driver. In certain examples, identifying location type includes identifying that the user does not have one distinct office location, such as a location where the user routinely visits and/or remains during certain period of time in a day.

In some examples, the methods and/or systems of the present disclosure includes determining one or more features associated with a user, such as based at least in part upon location data and timing data. In certain examples, the methods and/or systems of the present disclosure includes determining one or more unique locations associated with a user where the user spends more than a threshold amount of time (e.g., 50%, 60%, 70%, 80%, 90%) within a time period of interest. For example, multiple unique locations may be identified (e.g., as work locations) when a user spends more than 80% of the common working hours (e.g., 8 am to 6 pm) at those multiple unique locations. In certain examples, the methods and/or systems of the present disclosure includes determining a unique location cluster where a user is determined to spend more than the threshold amount of time at a location cluster (e.g., representing a region) rather than a specific one or more locations.

The unique location cluster may be associated with a density corresponding to the frequency of visits at the multiple locations within the location cluster. For example, a unique location cluster may be identified (e.g., as a working area) when a user on average stay at one or more locations that falls within the bound of the unique location cluster more than a threshold duration within a time period of interest. In some examples, the methods and/or systems of the present disclosure includes determining an average number of unique locations visited in a day and/or an average travel time between locations. In certain examples, the methods and/or systems of the present disclosure includes determining that sequential vehicular trips with trip durations below a predetermined threshold and/or with trip distances below a predetermined threshold are drop-off locations of a delivery vehicle.

In various examples, the methods and/or systems of the present disclosure includes receiving, by a trained model, features associated with a user as input and generate a prediction, as output, of whether a user has a fixed office location. In certain examples, the trained model is trained using supervised or unsupervised clustering algorithm may be used, such as where the resulting clusters are manually labeled based on internal structure.

In various embodiments, the methods and/or systems of the present disclosure includes identifying a job change associated with a user. In some examples, the methods and/or systems of the present disclosure includes identifying a change in office location(s), such as identifying that a construction work has begun working on a new site than the previous month. In various examples, identifying a change in office location(s) is based at least in part upon changes in variables of a structural model trained for determining work locations, such as data collected during time of work (e.g., 8 am to 8 pm). In some examples, identifying a change in office location(s) includes generating a baseline, such as that a user spends certain time of day and/or certain days of a week at a first location, which has historically been classified as a work location with confidence level exceeding a predetermined threshold. In some examples, identifying a change in office location(s) includes determining that the user is not at the first location and generating a confidence level that a structural change has occurred that corresponds in a change in user or travel pattern, such as one that corresponds to a job change and/or a change in office location. In various examples, identifying a change in office location(s) includes performing statistical analysis to determine whether a structural change has occurred and whether such structural change is significant beyond a predetermined threshold such that the change corresponds to a change in work location. In certain examples, a structural change corresponds to a structural change in a statistical distribution associated with a change in travel behavior, such as that a driver stopped visiting a first location and began visiting a second location, which may be associated with a change in work location and/or a job change.

In various embodiments, the methods and/or systems of the present disclosure includes detecting a work schedule. In various examples, detecting a work schedule includes classifying one or more locations as one or more work locations (e.g., office), determining one or more time periods during which a user stayed at the one or more work locations, and generating a work schedule to include the one or more time periods as working periods. In some examples, detecting a work schedule includes determining commuting periods associated with the user traveling to the determined one or more work locations and/or traveling from the determined one or more work locations (e.g., to return home). In certain examples, the methods and/or systems of the present disclosure includes training and using a model to predict an individual's work schedule based on one or more features (e.g., high-level features) associated with a user. In some examples, the features may include average time at each location (e.g., based on average time between trips), frequency of visiting one or more businesses of certain types. In various examples, the methods and/or systems of the present disclosure includes estimating a work schedule, generating a confidence level associated with the work schedule estimation, and upon determining that the confidence level is below a predetermined threshold, request user input to provide work schedule or work information associated with the work schedule, and validating whether the provided work schedule and/or work information conforms with sensor data or telematics data collected during the corresponding time periods and/or historic work schedules.

In various embodiments, the methods and/or systems of the present disclosure includes classifying a vehicular trip to be personal or for work, such as without driver input. For example, a technology or product configured to classify vehicular trip to be personal or for work in accordance with the present disclosure may not need user input or interaction to aid prediction. In some embodiments, the methods and/or systems of the present disclosure includes creating a set of features to predict if a trip was taken for work or for personal use. In certain examples, features may include qualitative rules and/or quantitative rules. In some examples, the qualitative rules may be used to manually classify trips as for work or for personal trip. In some examples, the quantitative rules may be learned via machine learning methods, such as supervised method or unsupervised method. In certain examples, a supervised method may be trained using labeled trip data collected from multiple users regarding which trips were for work and which were for personal use. In certain examples, an unsupervised method may be used to cluster trips into different segments based on identified features and the segments may next be manually classified as personal or for work. For example, a model may be trained to find structure in trip data to group trips for subsequent labeling.

In various embodiments, the methods and/or systems of the present disclosure includes classifying a vehicular trip to be personal or non-personal (e.g., for work), the vehicular trip being driven by a driver, the classification being based at least in part upon data associated with interaction with a mobile device (e.g., phone) by the driver during the vehicular trip. In some examples, the methods and/or systems of the present disclosure includes differentiating interaction of a mobile device during a vehicular trip for personal use and a vehicular trip for non-personal use (e.g., for work). In various examples, the methods and/or systems of the present disclosure includes using machine learning methods to differentiate patterns of mobile device use. For example, the methods and/or systems of the present disclosure includes identifying that a rideshare driver or a delivery driver interact with their associated mobile devices differently when driving for work (e.g., with a work vehicle) and when driving for personal use (e.g., with a personal vehicle). The identifying of such difference may be based at least in part upon one or more driver interaction data and/or the indicated interaction patterns with the mobile device.

In various examples, the methods and/or systems of the present disclosure includes receiving trip-based interaction data, such as receiving interaction data associated with shortly before a start of a vehicular trip, interaction data associated with during the vehicular trip, and/or interaction data associated with shortly before an end of the vehicular trip. In various examples, the methods and/or systems of the present disclosure includes classifying the vehicular trip as for personal use or for non-personal use based at least in part upon the received trip-based interaction data. For example, the methods and/or systems of the present disclosure may determine that mobile device use shortly before the end of a first vehicular trip and mobile device use shortly after the start of a second vehicular trip indicates that the driver is likely a rideshare driver (e.g., one who transports passengers) or a delivery driver (e.g., one who transports items). Such determination may be even more likely when the methods and/or systems of the present disclosure determines that the locations of the stopping locations are not locations commonly visited by the driver, such as when the stopping locations are at various intersections.

In some examples, the methods and/or systems of the present disclosure includes determining that mobile device interaction data collected during a vehicular trip indicate that the vehicular trip is for non-personal use (e.g., for work) when the mobile device interaction data are indicative of one or more usage patterns that matches one or more predetermined usage patterns and/or are recurring. For example, methods and/or systems of the present disclosure may determine that a rideshare driver repeats one or more first interactions with an associated mobile device whenever the rideshare driver picks up a passenger and one or more second interactions whenever the rideshare driver drops off a passenger. In some examples, methods and/or systems of the present disclosure includes training and using unsupervised machine learning methods such as time series clustering to identify how often a driver repeats one or more mobile device interactions, actions, or commands. In some examples, methods and/or systems of the present disclosure includes correlating mobile device interactions with driving patterns, where the correlations may be subsequently saved at a server for training the supervised learning model. The supervised learning model, once trained, may be configured to detect, based on mobile device interactions, driving patterns for other drivers for classifying vehicular trips driven by those other drivers, such as for differentiating personal use from non-personal use. In various examples, methods and/or systems of the present disclosure includes detecting patterns of mobile device use during a vehicular trip, determining if the detected patterns correspond to a driver driving to work or not, and classifying, based on the determination, the trip to be for personal use or for non-personal use. Unsupervised machine learning methods may be used.

In various embodiments, methods and/or systems of the present disclosure includes determining a total proportion of vehicular trips that were driven (e.g., by a driver or multiple drivers) for non-personal use (e.g., for work) during a time period of interest. In various embodiments, methods and/or systems of the present disclosure includes generating an estimated percentage of time driven (e.g., by a driver or multiple drivers) for non-personal use (e.g., for work) during a time period of interest. In some examples, methods and/or systems of the present disclosure includes determining a total proportion of vehicular trips that were driven (e.g., by a driver or multiple drivers) for personal use (e.g., for recreation) during a time period of interest. In various embodiments, methods and/or systems of the present disclosure includes generating an estimated percentage of time driven (e.g., by a driver or multiple drivers) for personal use (e.g., for recreation) during a time period of interest.

In various examples, generating the estimated percentage of time for the driver includes generating an aggregated estimated percentage of time based at least in part upon data associated with a plurality of vehicular trips driven by the driver within a time period of interest. In some examples, methods and/or systems of the present disclosure includes determining, such as using a trained model, a percentage of time driven and/or trips driven in a month was for non-personal use (e.g., for work). In certain examples, methods and/or systems of the present disclosure includes determining the percentage of time driven and/or trips driven to be for personal use or for non-personal use based at least in part upon the trip classification associated and the associated confidence level for each vehicular trip of the plurality of vehicular trips driven within the time period of interest. For example, methods and/or systems of the present disclosure may determine that 20% of the time driven and/or trip driven was for work when the driver drove five trips during a week of interest, where each trip was classified to be a work trip with low confidence level: 0.30, 0.10, 0.15, 0.20, 0.25.

In some examples, methods and/or systems of the present disclosure includes training a model using supervised learning including using a collection of labeled data to predict a proportion of driving driven during a time period of interest to be for non-personal use (e.g., for work). In certain examples, such prediction is based on trips taken during the period, during one or more past periods, and/or data associated with the driver. In some examples, methods and/or systems of the present disclosure includes training a model using risk-inferred supervised learning. In certain examples, methods and/or systems of the present disclosure includes training a model to predict whether a user is providing false data, such as when the provided data indicates a vehicular trip was for non-personal use when it was for personal use, or when the provided data indicates that a driver was not driving when the driver was. In some examples, methods and/or systems of the present disclosure includes predicting whether an insurance policy should be liable for an accident that occurred during a vehicular trip based at least in part upon determining whether the trip is for non-personal use (e.g., for work) or for personal use (e.g., recreation). Typically, a personal insurance policy associated with a driver is only liable for trips driven for personal use, where the place of work is instead liable for trips driven for work. Additionally, should the methods and/or systems of the present disclosure determine that an accident occurred during a work trip, the methods and/or systems of the present disclosure may determine that no adjustment to the driver's personal policy premium is needed. In contrast, should the methods and/or systems of the present disclosure determine that an accident occurred during a personal trip, the methods and/or systems of the present disclosure may determine that an increase to the driver's personal policy premium is needed.

In some examples, methods and/or systems of the present disclosure includes training the model to further predict, based at least in part upon the provisions of false data, an honesty metric and/or a likelihood of risky behavior. For example, a trained model of the present disclosure may be configured to determine that a collision occurred during a vehicular trip is not covered by the driver's personal insurance policy because the model determined that the vehicular trip was for non-personal use (e.g., for work), and that the user provided false data indicating that the vehicular trip was for personal use. The trained model may detect that the provided false data are in contradiction with telematics data, sensor data, location data, timing data, phone interaction data collected in associated with the vehicular trip. In certain examples, methods and/or systems of the present disclosure includes detecting a claim likelihood associated with a driver, the claim likelihood being lower when the number of trips driven and/or time driven within a time period of interest is shorter. In some examples, such claim likelihood may be normalized against the average time or trips driven by a plurality of vehicle operators, such as a plurality of vehicle operators similar to the target driver (e.g., live in the same region, drive the same car, and/or have the same job).

In various examples, methods and/or systems of the present disclosure includes determining a residual risk of a user, such as an error that remains from a main risk model (e.g., one including driver and/or trip rating and classification features), such that the predicted error acts as an proxy for the proportion of work trips (or a particular work trip), which may be rescaled as needed. In some examples, methods and/or systems of the present disclosure includes determining tuning a prediction of work trip proportions such that the prediction maximally predict an ultimate metric of interest, such as that whether a personal insurance policy should be liable for the risky behaviors occurred during a vehicular trip. In various examples, methods and/or systems of the present disclosure includes training a model to predict, such as based on features of vehicular trips, a score associated with a scoring period, and output trip-level probabilities based on the predicted score.

In one example, training a model includes training a model to predict, for each period of interest (e.g., a month) for each driver (e.g., a policyholder), a percentage of driving that was for work using any of the aforementioned methods. For example, for driver A, three months of predictions may be {14%, 24%, 5%}, corresponding to a prediction that 14% of the trips driven in the first month was for work, 24% of the trips driven in the second month was for work, and 5% of the trips driven in the third month was for work. As another example, for driver B, four months of predictions may be {5%, 5%, 0%, 0%, 3%}, corresponding to a prediction that 5% of the trips driven in the first month was for work, 0% of the trips driven in the second month was for work, 0% of the trips driven in the third month was for work, and 3% of the trips driven in the fourth month was for work.

In another example, training a model includes training a model to predict, such as using trip-level features, a month prediction. For example, driver A may have had driven one hundred trips within a first month, where a training dataset corresponding to such driving history may be {trip=1, y=0.14, X=[trip features for trip 1]}, {trip=2, y=0.14, X=[trip features for trip 2]}, . . . , {trip=100, y=0.14, X={trip features for trip 100]}. The value y is the ratio of trips driven in the month being for work. In some examples, all trips driven for multiple drivers may be merged into a single training dataset. For example, if each month had one hundred trips driven collectively by the multiple drivers, then the first 100 examples of the dataset may still be the dataset of driver A's driving history above, whereas the next 100 examples of the dataset would correspond to the second month for driver A or driver B, which, as an example, may have a different target y value of 0.24. In certain examples, a machine learning model may use group cross validation at the individual level when performing hyperparameter optimization. In some examples, the model is trained to predict a probability of a work trip for every trip. In certain examples, a user may threshold the trip-level probabilities to assign a work driving label to certain trips.

In various embodiments, methods and/or systems of the present disclosure includes integrating with company application programming interface (API) such that data (e.g., labeled data) may be transmitted from third-parties (e.g., rideshare companies and/or delivery companies) to one or more devices (e.g., servers) of the present disclosure. The data transmitted from third-parties may include mobile device interaction data, telematics data, and/or timing data and may be used for training any of the aforementioned models such that the models are trained to make predictions or classifications more accurately for applications associated with the third-parties (e.g., ridesharing, delivery service).

In various embodiments, the methods and/or systems of the present disclosure includes classifying a vehicular trip to be personal or for work, such as with driver input. For example, a technology or product configured to classify vehicular trip to be personal or for work in accordance with the present disclosure may request user input or interaction to aid prediction. In some examples, the methods and/or systems of the present disclosure includes using one or more interaction triggers. In some examples, the methods and/or systems of the present disclosure includes generating, such as using twin models or Bayesian methods, a final probability estimate at a scoring period level or a trip level and generating a confidence interval associated with the prediction. In some examples, the methods and/or systems of the present disclosure includes using the confidence interval as a trigger to prompt one or more actions (e.g., business actions), such as sending a survey to a user or customer to request the user or customer to provide additional information related to one or more vehicular trips. For example, a determination that 5% of a customer's trips during a month were for work and the confidence intervals were ±1% would have little final impact on a final risk assessment of the customer. In contrast, a determination that 50% of a customer's trips during a month were for work and the confidence intervals were ±25% would indicate unacceptable amount of uncertainty in this prediction, and may prompt the methods and/or systems of the present disclosure to request additional information from the user to help reduce such uncertainty of the prediction.

In various embodiments, methods and/or systems of the present disclosure includes collecting or receiving information or data for improving the confidence of a first prediction. In some examples, methods and/or systems of the present disclosure includes collecting or receiving information or data to improve odometer consistency, such as by at least requesting user to submit odometer readings of an associated vehicle (e.g., a personal vehicle). The methods and/or systems of the present disclosure may further includes determining a subset of trips that would have had been taken for a particular use (e.g., for personal use) for the actual odometer readings to be substantially consistent (e.g., within 20%, 10%, 5%, or 1% difference) with the user-provided odometer readings.

In various embodiments, methods and/or systems of the present disclosure includes validating work mileage, such as of an employee. In some examples, methods and/or systems of the present disclosure includes: receiving a work mileage reimbursement submission, such as from an employee who drove his/her personal vehicle for work; determining a percentage of the driving (e.g., trips or time driven) for work based at least in part upon the work mileage reimbursement submission; determining a percentage of the driving (e.g., trips or time driven) for personal use based at least in part upon the percentage of the driving for work and trip data associated with all trips driven, including both work and personal trips, during a time period of interest. In certain examples, methods and/or systems of the present disclosure includes receiving additional user-provided information to aid such determination of percentages, such as information indicative of the nature of a trip for improving prediction confidence. For example, if driver A drives for delivery service A and for delivery service B using his personal vehicle, driver may submit data indicative of work mileage A driven for delivery service A and work mileage B driven for delivery service B to prove that driver is not requesting double-reimbursement for the same time period from both delivery services.

In various embodiments, methods and/or systems of the present disclosure includes receiving a work responsibilities survey, such as from an employee. In some examples, methods and/or systems of the present disclosure includes: receiving work schedule and/or responsibilities associated with the employment; building a model using driving data or results of a plurality of employees having similar answers in their corresponding surveys; creating, such as automatically, one or more filters based on the rules described by a customer (e.g., the employer), to classify one or more trips based on patterns associated with a driver (e.g., employee) drove for work; and/or validating, such as at the point of a claim, employee-provided information with data collected (e.g., via sensors) such that information mismatch (e.g., indicative of employee's provision of false data) may be detected and penalty may be incurred.

In various embodiments, methods and/or systems of the present disclosure includes: receiving user classification of one or more trips and/or estimated driving percentage (e.g., percentage of trips and/or time driven for personal use or for non-personal use); determining a likelihood of the user-provided classification and/or estimated driving percentage being accurate and/or consistent with sensor data; determining whether user-provided the accuracy and/or consistency is above a predetermined threshold; and upon determining that the user-provided the accuracy and/or consistency is above a predetermined threshold, accept the user-provided classification and/or estimated driving percentage. In some examples, methods and/or systems of the present disclosure helps validate user-provided data and avoid user-provided classification fraud, such as when a user claims to have driven for personal use when in actuality (e.g., as indicated by sensor data), the trip was for non-personal use (e.g., for work).

In various embodiments, methods and/or systems of the present disclosure includes receiving customer, user, or driver indication that a trip was driven for work, such as by at least receiving a selected driving mode (e.g., via a mobile application), such that a claim occurred during a trip is labeled as denied if the selected mode is for work. In some examples, a user may select a driving mode via a voice command, gesture (phone gesture), and/or physical interaction with a mobile device (e.g., tapping, swiping). The mobile device may be a phone, a vehicle on-board computer, or an additionally installed hardware.

One or More Examples of Machine Learning According to Various Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

One or More Examples of Modules According to Various Embodiments

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or operations of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additional Considerations According to Various Embodiments

In some examples, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for classifying a vehicular trip, the method comprising:
    obtaining a user classification associated with an unlabeled vehicular trip as for work or for personal use;
    obtaining a first set of historic device interaction data associated with a first set of historic vehicular trips during which a vehicle operator operated a vehicle for work;
    obtaining a second set of historic device interaction data associated with a second set of historic vehicular trips during which the vehicle operator operated the vehicle for personal use;
    training a classification model based at least in part upon the first set of historic device interaction data and the second set of historic device interaction data such that:
        upon receiving an input of device interaction data selected from the first set of historic device interaction data, the classification model outputs a classification for an associated vehicular trip as for work; and
        upon receiving an input of device interaction data selected from the second set of historic device interaction data, the classification model outputs a classification for an associated vehicular trip as for personal use;
    obtaining a set of unlabeled device interaction data associated with the unlabeled vehicular trip;
    outputting a machine classification, using the classification model, the unlabeled vehicular trip as for work or for personal use by at least:
        identifying, based at least in part upon the first set of historic device interaction data, a first set of baseline device interaction features associated with the first set of historic vehicular trips;
        identifying, based at least in part upon the second set of historic device interaction data, a second set of baseline device interaction features associated with the second set of historic vehicular trips;
        identifying, based at least in part upon the set of unlabeled device interaction data, a set of representative device interaction features associated with the unlabeled vehicular trip;
        comparing the set of representative device interaction features against the first set of baseline device interaction features and the second set of baseline device interaction features;
        obtaining a set of weights associated with the first set of baseline device interaction features, the second set of baseline device interaction features, and the set of representative device interaction features such that each baseline device interaction feature and an associated representative device interaction feature is assigned with a weight, wherein the set of weights comprise:
            a first weight for a device interaction feature of content switching:
            a second weight for a device interaction feature of entering text; and
            a third weight for a device interaction feature of taking a phone call, wherein the first weight and the second weight are greater than the third weight; and
        classifying the unlabeled vehicular trip by one of:
            upon determining that the set of representative device interaction features deviates from the first set of baseline device interaction features less than from the second set of baseline device interaction features, classifying the unlabeled vehicular trip as for work; or
            upon determining that the set of representative device interaction features deviates from the first set of baseline device interaction features more than from the second set of baseline device interaction features, classifying the unlabeled vehicular trip as for personal use; and
    validating the user classification based at least in part upon the user classification and the machine classification made using the classification model.

2. The computer-implemented method of claim 1, wherein validating the user classification includes:
    accepting the user classification upon determining that the user classification matches the machine classification made using the classification model; or
    rejecting the user classification upon determining that the user classification does not match the machine classification made using the classification model.

3. The computer-implemented method of claim 1, wherein:
    classifying the unlabeled vehicular trip includes generating a confidence level associated with the machine classification made using the classification model; and
    validating the user classification includes accepting the user classification upon determining that the confidence level is less than a confidence threshold.

4. The computer-implemented method of claim 1, wherein validating the user classification includes:

obtaining a community classification for a set of similar vehicular trips traveled by one or more similar vehicle operators (a) having similar travel paths as the unlabeled vehicular trip, (b) sharing a common employer, (c) sharing a common work region, or (d) sharing a common work schedule with the vehicle operator; and accepting the user classification upon determining that the user classification matches the machine classification made using the classification model and the community classification.

5. The computer-implemented method of claim 1, further comprising:

obtaining a work insurance claim submitted by the vehicle operator associated with the unlabeled vehicular trip; and determining, based at least in part upon the machine classification, a claim decision by at least:
  determining the claim decision as accept claim when the machine classification is for work; or
  determining the claim decision as reject claim when the machine classification is for personal use.

6. The computer-implemented method of claim 1, further comprising:

obtaining a personal insurance claim submitted by the vehicle operator associated with the unlabeled vehicular trip; and determining, based at least in part upon the machine classification, a claim decision by at least:
  determining the claim decision as accept claim when the machine classification is for personal use; or
  determining the claim decision as reject claim when the machine classification is for work.

7. The computer-implemented method of claim 1, further comprising:

upon classifying the unlabeled vehicular trip as for work, determining a set of policy modifications associated with a work insurance policy of the vehicle operator based at least in part upon the set of representative device interaction features; or upon classifying the unlabeled vehicular trip as for personal use, determining a set of policy modifications associated with a personal insurance policy of the vehicle operator based at least in part upon the set of representative device interaction features.

8. The computer-implemented method of claim 7, wherein the one or more policy modifications includes modify policy premium, modify a risk score, modify an operator behavioral score, modify a policy incentive, issue a reimbursement, or modify a device interaction challenge.

9. The computer-implemented method of claim 1, further comprising:

obtaining a first set of historic path conditions associated with the first set of historic vehicular trips;

obtaining a second set of historic path conditions associated with the second set of historic vehicular trips; and obtaining a set of unlabeled path conditions associated with the unlabeled vehicular trip, wherein:
  the identifying the first set of baseline device interaction features includes calibrating the first set of baseline device interaction features based at least in part upon the first set of historic path conditions;
  the identifying the second set of baseline device interaction features includes calibrating the second set of baseline device interaction features based at least in part upon the second set of historic path conditions; and
  the identifying the set of representative device interaction features includes calibrating the set of representative device interaction features based at least in part upon the set of unlabeled path conditions.

10. The computer-implemented method of claim 9, wherein each of the first set of historic path conditions, the second set of historic path conditions, and the set of unlabeled path conditions includes path curvature, path speed limit, average speed by travelers on path, traffic condition, weather condition, or time of day.

11. The computer-implemented method of claim 1, wherein classifying the unlabeled vehicular trip further includes:

identifying, based at least in part upon the first set of baseline device interaction features, a first set of baseline feature vectors associated with the first set of historic vehicular trips;

identifying, based at least in part upon the second set of baseline device interaction features, a second set of baseline feature vectors associated with the second set of historic vehicular trips;

identifying, based at least in part upon the set of representative device interaction features, a set of representative feature vectors associated with the unlabeled vehicular trip;

mapping the first set of baseline feature vectors, the second set of baseline feature vectors, and the set of representative feature vectors on a feature space;

determining a first set of vector deviations between the set of representative feature vectors and the first set of baseline feature vectors in the feature space;

determining a second set of vector deviations between the set of representative feature vectors and the second set of baseline feature vectors in the feature space; and classifying the unlabeled vehicular trip by at least:
  upon determining that the first set of vector deviations is less than the second set of vector deviations, classifying the unlabeled vehicular trip as for work; or
  upon determining that the first set of vector deviations is more than the second set of vector deviations, classifying the unlabeled vehicular trip as for personal use.

12. The computer-implemented method of claim 11, further comprising:

determining a first similarity metric based at least in part upon the first set of vector deviations;

determining a second similarity metric based at least in part upon the second set of vector deviations; and classifying the unlabeled vehicular trip by at least:
  upon determining that the first similarity metric is more than the second similarity metric, classifying the unlabeled vehicular trip as for work; or
  upon determining that the first similarity metric is less than the second similarity metric, classifying the unlabeled vehicular trip as for personal use.

13. The computer-implemented method of claim 12, wherein determining the first similarity metric and the second similarity metric includes:

obtaining the set of weights;

determining, for each device interaction feature, a multiplication product by multiplying each vector deviation by an associated weight; and determining the first similarity metric and the second similarity metric as weighted similarity metrics based at least in part upon a sum of the multiplication products for each of the first set of vector deviations and the second set of vector deviations.

14. The computer-implemented method of claim 1, wherein:
identifying the first set of baseline device interaction features includes identifying a first sequence of baseline device interaction features based at least in part upon the first set of historic device interaction data;
identifying the second set of baseline device interaction features includes identifying a second sequence of baseline device interaction features based at least in part upon the second set of historic device interaction data;
identifying the set of representative device interaction features includes identifying a sequence of representative device interaction features based at least in part upon the set of unlabeled device interaction data;
comparing the set of representative device interaction features against the first set of baseline device interaction features and the second set of baseline device interaction features includes comparing the sequence of representative device interaction features against the first sequence of baseline device interaction features and the second sequence of baseline device interaction features; and
classifying the unlabeled vehicular trip includes:
upon determining that the sequence of representative device interaction features deviates from the first sequence of baseline device interaction features less than from the second sequence of baseline device interaction features, classifying the unlabeled vehicular trip as for work; or
upon determining that the sequence of representative device interaction features deviates from the first sequence of baseline device interaction features more than from the second sequence of baseline device interaction features, classifying the unlabeled vehicular trip as for personal use.

15. The computer-implemented method of claim 14, wherein classifying the unlabeled vehicular trip further includes:
identifying, based at least in part upon the first sequence of baseline device interaction features, a first baseline vector pattern;
identifying, based at least in part upon the second sequence of baseline device interaction features, a second baseline vector pattern;
identifying, based at least in part upon the sequence of representative device interaction features, a representative vector pattern;
mapping the first baseline vector pattern, the second baseline vector pattern, and the representative vector pattern on a feature space;
determining a first vector pattern deviation between the first baseline vector pattern and the representative vector pattern in the feature space;
determining a second vector pattern deviation between the second baseline vector pattern and the representative vector pattern in the feature space; and
classifying the unlabeled vehicular trip by at least:
upon determining that the first vector pattern deviation is less than the second vector pattern deviation, classifying the unlabeled vehicular trip as for work; or
upon determining that the first vector pattern deviation is more than the second vector pattern deviation, classifying the unlabeled vehicular trip as for personal use.

16. The computer-implemented method of claim 1, wherein each of the first set of baseline device interaction features, the second set of baseline device interaction features, and the set of representative device interaction features includes taking a phone call, making a phone call, content switching, content interacting, entering text, interacting with a navigation application, interacting with a communication application, interacting with a vehicle monitoring application, interacting with a delivery application, interacting with a rideshare application, interacting with a finance application, interacting with an internet browsing application, interacting with a shopping application, or interacting with an entertainment application.

17. The computer-implemented method of claim 16, wherein each of the first set of baseline device interaction features, the second set of baseline device interaction features, and the set of representative device interaction features includes interaction frequency information, interaction duration information, interaction complexity information, or interaction method information.

18. A computing system for classifying a vehicular trip, the computing system comprising:
one or more processors; and
a memory storing instructions that, upon execution by the one or more processors, cause the computing system to perform one or more processes including:
obtaining a user classification associated with an unlabeled vehicular trip as for work or for personal use;
obtaining a first set of historic device interaction data associated with a first set of historic vehicular trips during which a vehicle operator operated a vehicle for work;
obtaining a second set of historic device interaction data associated with a second set of historic vehicular trips during which the vehicle operator operated the vehicle for personal use;
training a classification model based at least in part upon the first set of historic device interaction data and the second set of historic device interaction data such that:
upon receiving an input of device interaction data selected from the first set of historic device interaction data, the classification model outputs a classification for an associated vehicular trip as for work; and
upon receiving an input of device interaction data selected from the second set of historic device interaction data, the classification model outputs a classification for an associated vehicular trip as for personal use;
obtaining a set of unlabeled device interaction data associated with the unlabeled vehicular trip;
outputting a machine classification, using the classification model, the unlabeled vehicular trip as for work or for personal use by at least:
identifying, based at least in part upon the first set of historic device interaction data, a first set of baseline device interaction features associated with the first set of historic vehicular trips;
identifying, based at least in part upon the second set of historic device interaction data, a second set of baseline device interaction features associated with the second set of historic vehicular trips;

identifying, based at least in part upon the set of unlabeled device interaction data, a set of representative device interaction features associated with the unlabeled vehicular trip;
comparing the set of representative device interaction features against the first set of baseline device interaction features and the second set of baseline device interaction features;
obtaining a set of weights associated with the first set of baseline device interaction features, the second set of baseline device interaction features, and the set of representative device interaction features such that each baseline device interaction feature and an associated representative device interaction feature is assigned with a weight, wherein the set of weights comprise:
a first weight for a device interaction feature of content switching;
a second weight for a device interaction feature of entering text; and
a third weight for a device interaction feature of taking a phone call, wherein the first weight and the second weight are greater than the third weight; and
classifying the unlabeled vehicular trip by at least one of:
upon determining that the set of representative device interaction features deviates from the first set of baseline device interaction features less than from the second set of baseline device interaction features, classifying the unlabeled vehicular trip as for work; or
upon determining that the set of representative device interaction features deviates from the first set of baseline device interaction features more than from the second set of baseline device interaction features, classifying the unlabeled vehicular trip as for personal use; and
validating the user classification based at least in part upon the user classification and the machine classification made using the classification model.

19. A non-transitory computer-readable medium storing instructions for classifying a vehicular trip, the instructions upon execution by one or more processors of a computing system, cause the computing system to perform one or more processes including:
obtaining a user classification associated with an unlabeled vehicular trip as for work or for personal use;
obtaining a first set of historic device interaction data associated with a first set of historic vehicular trips during which a vehicle operator operated a vehicle for work;
obtaining a second set of historic device interaction data associated with a second set of historic vehicular trips during which the vehicle operator operated the vehicle for personal use;
training a classification model based at least in part upon the first set of historic device interaction data and the second set of historic device interaction data such that:
upon receiving an input of device interaction data selected from the first set of historic device interaction data, the classification model outputs a classification for an associated vehicular trip as for work; and
upon receiving an input of device interaction data selected from the second set of historic device interaction data, the classification model outputs a classification for an associated vehicular trip as for personal use;
obtaining a set of unlabeled device interaction data associated with the unlabeled vehicular trip;
outputting a machine classification, using the classification model, the unlabeled vehicular trip as for work or for personal use by at least:
identifying, based at least in part upon the first set of historic device interaction data, a first set of baseline device interaction features associated with the first set of historic vehicular trips;
identifying, based at least in part upon the second set of historic device interaction data, a second set of baseline device interaction features associated with the second set of historic vehicular trips;
identifying, based at least in part upon the set of unlabeled device interaction data, a set of representative device interaction features associated with the unlabeled vehicular trip;
comparing the set of representative device interaction features against the first set of baseline device interaction features and the second set of baseline device interaction features;
obtaining a set of weights associated with the first set of baseline device interaction features, the second set of baseline device interaction features, and the set of representative device interaction features such that each baseline device interaction feature and an associated representative device interaction feature is assigned with a weight, wherein the set of weights comprise:
a first weight for a device interaction feature of content switching;
a second weight for a device interaction feature of entering text; and
a third weight for a device interaction feature of taking a phone call, wherein the first weight and the second weight are greater than the third weight; and
classifying the unlabeled vehicular trip by one of:
upon determining that the set of representative device interaction features deviates from the first set of baseline device interaction features less than from the second set of baseline device interaction features, classifying the unlabeled vehicular trip as for work; or
upon determining that the set of representative device interaction features deviates from the first set of baseline device interaction features more than from the second set of baseline device interaction features, classifying the unlabeled vehicular trip as for personal use; and
validating the user classification based at least in part upon the user classification and the machine classification made using the classification model.

20. The non-transitory computer-readable medium of claim 19, wherein validating the user classification includes:
accepting the user classification upon determining that the user classification matches the machine classification made using the classification model; or
rejecting the user classification upon determining that the user classification does not match the machine classification made using the classification model.

* * * * *